United States Patent
Zhang et al.

(10) Patent No.: US 10,013,313 B2
(45) Date of Patent: Jul. 3, 2018

(54) INTEGRATED DATABASE AND LOG BACKUP

(71) Applicant: Actifio, Inc., Waltham, MA (US)

(72) Inventors: Xiangdong Zhang, Wellesley, MA (US); Uday Tekade, Westford, MA (US); Sachindra Kumar, Farmingham, MA (US); Madhav Mutalik, Southborough, MA (US)

(73) Assignee: Actifio, Inc., Waltham, MA (US)

( * ) Notice: Subject to any disclaimer, the term of this patent is extended or adjusted under 35 U.S.C. 154(b) by 195 days.

(21) Appl. No.: 14/856,208

(22) Filed: Sep. 16, 2015

(65) Prior Publication Data
US 2016/0077923 A1 Mar. 17, 2016

Related U.S. Application Data

(60) Provisional application No. 62/063,180, filed on Oct. 13, 2014, provisional application No. 62/051,138, filed on Sep. 16, 2014.

(51) Int. Cl.
*G06F 11/14* (2006.01)
*G06F 17/30* (2006.01)
*G06F 3/06* (2006.01)
*H04L 12/24* (2006.01)

(52) U.S. Cl.
CPC .......... *G06F 11/1451* (2013.01); *G06F 3/065* (2013.01); *G06F 3/067* (2013.01); *G06F 3/0619* (2013.01); *G06F 3/0641* (2013.01); *G06F 11/1435* (2013.01); *G06F 11/1453* (2013.01); *G06F 11/1456* (2013.01); *G06F 11/1461* (2013.01); *G06F 11/1464* (2013.01); *G06F 17/30215* (2013.01); *G06F 17/30371* (2013.01);
(Continued)

(58) Field of Classification Search
CPC ...... G06F 3/0619; G06F 3/0641; G06F 3/065; G06F 3/067; G06F 11/1435; G06F 11/1451; G06F 11/1453; G06F 11/1456; G06F 11/1461; G06F 11/1464; G06F 17/30215; G06F 17/3037; G06F 2201/84; H04L 1/5003
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |

(Continued)

OTHER PUBLICATIONS

International Search Report and Written Opinion issued by the U.S. Patent and Trademark Office as International Searching Authority for International Application No. PCT/US15/050391 dated Jan. 19, 2016 (12 pgs.).

(Continued)

*Primary Examiner* — Reginald Bragdon
*Assistant Examiner* — Mehdi Namazi
(74) *Attorney, Agent, or Firm* — Wilmer Cutler Pickering Hale and Dorr LLP

(57) ABSTRACT

Systems and methods of performing backup of databases and associated logs with one schedule such that a backup of both a database and its associated log can be restored or recovered to a desired point in time. A backup request associated with a backup type is received and defined by a service level agreement. The service level agreement includes a combined schedule for backing up both data stored in the database and log data associated with a database.

20 Claims, 21 Drawing Sheets

(52) U.S. Cl.
CPC ...... *H04L 41/5003* (2013.01); *G06F 2201/84* (2013.01)

(56) References Cited

U.S. PATENT DOCUMENTS

| | | | |
|---|---|---|---|
| 5,497,483 A | 3/1996 | Beardsley et al. | |
| 5,535,381 A | 7/1996 | Kopper | |
| 5,819,292 A | 10/1998 | Hitz et al. | |
| 5,828,876 A | 10/1998 | Fish et al. | |
| 5,857,208 A | 1/1999 | Ofek | |
| 5,963,962 A | 10/1999 | Hitz et al. | |
| 6,065,018 A | 5/2000 | Beier et al. | |
| 6,081,875 A | 6/2000 | Clifton et al. | |
| 6,119,208 A | 9/2000 | White et al. | |
| 6,131,148 A | 10/2000 | West et al. | |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St. Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,477,591 B1 | 11/2002 | Vanderspek | |
| 6,484,186 B1 | 11/2002 | Rungta | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,772,302 B1 | 8/2004 | Thompson | |
| 6,779,094 B2 | 8/2004 | Selkirk et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,251,708 B1 | 7/2007 | Justiss et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,428,657 B2 | 9/2008 | Yamasaki | |
| 7,467,267 B1 | 12/2008 | Mayock | |
| 7,552,294 B1 | 6/2009 | Justiss | |
| 7,574,461 B1 | 8/2009 | Armorer et al. | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,797,284 B1 | 9/2010 | Chellappa et al. | |
| 7,814,128 B2 | 10/2010 | Silvers et al. | |
| 7,937,547 B2 | 5/2011 | Liu et al. | |
| 8,037,032 B2 | 10/2011 | Pershin et al. | |
| 8,095,756 B1 | 1/2012 | Somavarapu et al. | |
| 8,139,575 B2 | 3/2012 | Biran et al. | |
| 8,150,808 B2 | 4/2012 | Zha et al. | |
| 8,161,077 B2 | 4/2012 | Zha et al. | |
| 8,180,740 B1 | 5/2012 | Stager et al. | |
| 8,180,742 B2 | 5/2012 | Claudatos et al. | |
| 8,299,944 B2 | 10/2012 | Provenzano | |
| 8,407,191 B1 | 3/2013 | Nanda | |
| 8,468,174 B1 | 6/2013 | Yueh et al. | |
| 8,548,944 B2 | 10/2013 | Yueh | |
| 8,566,361 B2 | 10/2013 | Zha et al. | |
| 8,706,833 B1 | 4/2014 | Bergant et al. | |
| 8,732,418 B1 | 5/2014 | Abdulla | |
| 8,788,769 B2 | 7/2014 | Abercrombie et al. | |
| 9,098,432 B1 | 8/2015 | Bachu et al. | |
| 9,165,001 B1 | 10/2015 | Upadhyay et al. | |
| 9,171,002 B1 | 10/2015 | Mam et al. | |
| 9,384,200 B1 | 7/2016 | Batchu et al. | |
| 9,519,432 B1 | 12/2016 | Haustein et al. | |
| 2002/0111929 A1 | 8/2002 | Pudipeddi et al. | |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2003/0149683 A1 | 8/2003 | Lee et al. | |
| 2004/0199570 A1 | 10/2004 | Terao | |
| 2005/0004954 A1 | 1/2005 | Soule | |
| 2005/0066095 A1 | 3/2005 | Mullick et al. | |
| 2005/0138091 A1 | 6/2005 | Bono | |
| 2005/0165794 A1 | 7/2005 | Mosescu | |
| 2005/0192989 A1 | 9/2005 | Adiba et al. | |
| 2006/0059207 A1 | 3/2006 | Hirsch et al. | |
| 2006/0074945 A1 | 4/2006 | Mori | |
| 2006/0129508 A1 | 6/2006 | Cannon et al. | |
| 2008/0256593 A1 | 10/2008 | Vinberg et al. | |
| 2008/0270436 A1 | 10/2008 | Fineberg et al. | |
| 2009/0222496 A1 | 9/2009 | Liu et al. | |
| 2011/0004601 A1 | 1/2011 | Peckham et al. | |
| 2011/0161295 A1 | 6/2011 | Ngo | |
| 2011/0258161 A1 | 10/2011 | Constantinescu et al. | |
| 2012/0123999 A1 | 5/2012 | Ashutosh et al. | |
| 2012/0124046 A1 | 5/2012 | Provenzano | |
| 2012/0166448 A1 | 6/2012 | Li et al. | |
| 2013/0159646 A1 | 6/2013 | Atzmon et al. | |
| 2013/0318463 A1 | 11/2013 | Clifford | |
| 2016/0092535 A1 | 3/2016 | Kuchibhotla et al. | |
| 2017/0010941 A1 | 1/2017 | Shimada et al. | |

OTHER PUBLICATIONS

Alapati, "NetApp Technical Report: SnapMirror Sync and SnapMirror Semi-Sync Overview and Design Considerations," NetApp, Jul. 2010 (24 pages).
American Megatrends, Inc., "StorTrends/ManageTrends (Version 2.7) User's Guide for the StorTends 1300 Storage Appliance" Mar. 23, 2009 (378 pages).
Arrell et al., "Using RVA and SnapShot for Business Intelligence Applications with OS/390 and DB2," IBM, Redbooks, Aug. 1998 (70 pages).
Baird, "Virtual Storage Architecture Guide (VSAG)," IEEE, No Month Listed 1995 (pp. 312-326).
Baker, "Disk-Based Mirroring Is a Lot More Than Just Safe," Computer Technology Review, No Month Listed 2000 (pp. 55-57).
Cederqvist et al., "Version Management with CVS," No Month Listed 1992 (122 pages).
Chang et al., "Performance Analysis of Two Frozen Image Based Backup/Restore Methods," IEEE International Conference on Electron Information Technology 2005, May 22-25, 2005 (7 pages).
Chapman et al., "SnapMirror® Best Practices Guide," Network Appliance, Inc., Apr. 2006 (63 pages).
Chatterjee et al., "Efficient Replication Leveraging Information Lifecycle Management in Data Storage Systems," Provisional Patent Application No. Not Available, Feb. 9, 2009 (25 pages).
Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).
Chutani et al., "The Episode File System," Usenix Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," No Month Listed 2010 (35 pages).
Dantz Development Corporation, "Retrospect® User's Guide," No Month Listed 2002 (262 pages).

(56) References Cited

OTHER PUBLICATIONS

Degwekar, "Using SnapMirror® with SnapDrive® for Unix®," No Month Listed 2007 (11 pages).

Delphix Corp.'s Invalidity Contentions Under Patent L.R. 3-3, Jul. 24, 2014 (27 pages).

Edwards et al., "FlexVol: Flexible, Efficient File Volume Virtualization in WAFL," Usenix Association, Usenix '08: 2008 Usenix Annual Technical Conference, No Month Listed 2008 (pp. 129-142).

You et al., "Deep Store: An Archival Storage System Architecture," Proceedings of the 21st International Conference on Data Engineering, No Month Listed 2005 (12 pages).

Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).

EMC, "Backup of Oracle in EMC Symmetrix Environments with EMC NetWorker PowerSnap," Aug. 2008 (25 pages).

Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).

EMC, "EMC Celerra Version 5.6 Technical Primer: SLA-Driven Replication with Celerra Replicator (V2): Technology Concepts and Business Considerations," Jul. 2008 (20 pages).

EMC, "EMC DL1500 and DL3000 with EMC NetWorker: Best Practices Planning," Jul. 2009 (36 pages).

EMC, "Next-Generation Backup-to-Disk: Building the Foundation for Effective Operational Recovery Management," Jan. 31, 2005 (9 pages).

EMC, "Unified Backup and Recovery with EMC NetWorker," Mar. 2010 (16 pages).

Exhibit 1004 IPR2015-01689, Declaration of Ellie Young, Aug. 5, 2015 (24 pages).

Exhibit 1006 IPR2015-01678, Pfaffenberger, Webster's New World Computer Dictionary Ninth Edition, Hungry Minds, Inc., New York, New York, No Month Listed 2001 (4 pages).

Exhibit 1006 IPR2015-01689, File History for U.S. Appl. No. 12/947,393, Apr. 14, 2015 (108 pages).

Exhibit 1007 IPR2015-01678, Microsoft Computer Dictionary Fourth Edition, Microsoft Press, Redmond, Washington, No Month Listed 1999 (3 pages).

Exhibit 1007 IPR2015-01689, Declaration of Prashant Shenoy, Ph.D. in Support of Petition for Inter Partes Review, Aug. 5, 2015 (82 pages).

Exhibit 1008 IPR2015-01678, File History for U.S. Appl. No. 12/947,438, Apr. 14, 2015 (100 pages).

Exhibit 1009 IPR2015-01678, Declaration of Prashant Shenoy, Ph.D. in Support of Petition for Inter Partes Review, Aug. 5, 2015 (58 pages).

Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).

Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).

Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).

Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).

Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).

Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).

Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).

Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).

Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).

Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).

Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).

Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).

Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).

Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).

Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).

Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).

Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).

Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).

Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).

Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).

Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).

Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).

Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).

Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).

Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).

Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).

(56) References Cited

OTHER PUBLICATIONS

Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).

(56) References Cited

OTHER PUBLICATIONS

Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," Acm, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™. . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).

| Backup ID | Composite Backup ID | Backup Time | Backup Type | Recover Range | Expiration Time |
|---|---|---|---|---|---|
| 1000 | C-100 | T0 | Database | T0 | T0 + 7d |
| 1001 | C-100 | T0 + 30m | Log | T0 – (T0 + 30m) | T0 + 60m |
| 1002 | C-100 | T0 + 60m | Log | T0 – (T0 + 60m) | T0 + 90m |
| 1003 | C-100 | T0 + 90m | Log | T0 – (T0 + 90m) | T0 + 120m |
| 1004 | C-100 | T0 + 120m | Log | T0 – (T0 + 120m) | T0 + 150m |
| ...... | C-100 |  | Log |  | ...... |
| 1048 | C-101 | (T0 + 24h) T1 | Database | T1 | T0 + 8d |
| 1049 | C-100, C-101 | T0 + 24h | Log | T0 – (T0 + 24h) | T0 + 7d |
| 1050 | C-101 | T1 + 30m | Log | T1 – (T1 + 30m) | T1 + 60m |
| ...... | C-101 |  | Log |  |  |
| 1072 | C-102 | (T0 + 48h) T2 | Database | T2 | T0 + 9d |
| 1073 | C-101, C-102 | T0 + 48h | Log | T1 – (T1 + 24h) | T0 + 8d |
| 1074 | C-102 | T2 + 30m | Log | T2 – (T2 + 30m) | T2 + 60m |
| 1075 | C-102 | T3 + 30m | Log | T2 – (T2 + 60m) | T2 + 90m |
| ...... |  |  |  |  |  |

FIG. 7

- CreateFileWorkItem 1902
- CopyBytesWorkItem 1904
- UpdateFileMetadataWorkItem 1906
- CreateDirectoryWorkItem 1908
- DeleteFileWorkItem 1910
- DeleteDirectoryWorkItem 1912
- CreateSymLinkWorkItem 1914

FIG. 19A

INTEGRATED DATABASE AND LOG BACKUP

CROSS REFERENCE TO RELATED APPLICATIONS

This application claims the benefit under 35 U.S.C. § 119(e) of Provisional Application No. 62/051,138, entitled "Apparatus and Computerized Methods for Copy Data Management," filed Sep. 16, 2014; and Provisional Application No. 62/063,180, filed Oct. 13, 2014, entitled "Copy Data Techniques," the entire contents of which are incorporated by reference here in their entirety.

This application is related to International Application No. PCT/US2015/050391, entitled "Copy Data Techniques," filed on Sep. 16, 2015; and This application is related to U.S. patent application Ser. No. 14/856,196, entitled "Multi-Threaded Smart Copy," filed on Sep. 16, 2015.

TECHNICAL FIELD

The techniques described herein generally relate to data backup, and in particular to integrating a database and log backup and to copying data using a multi-thread technique.

BACKGROUND

Traditionally, a database and its log can only be protected together using single schedule, (backup database plus log) or protected separately under different schedules. A single schedule protection scheme is not able to achieve a desired recovery point objective (RPO) in a production environment. A separate schedule protection scheme results in two individual streams between database backup and log backup without apparent relationships, making it harder when it comes to restoring data. The relationship is mostly kept by manually through records maintained by individuals.

Traditionally, backup copy operation has been single threaded operation with the identification of files to copy and the copying of files intermixed. Due to the serial nature of copying, back up operations can take a long time.

SUMMARY

Embodiments of the present disclosure relate to systems and methods of performing backup of databases and associated logs with one schedule such that a backup of both a database and its associated log can be restored or recovered to a desired point in time. In some embodiments, a backup request is received at a virtual data management system configured to protect an application. In some embodiments, the backup request is associated with a backup type defined by a service level agreement, the service level agreement defining a schedule for backing up a database associated with the application. In some embodiments, the service level agreement includes a combined schedule for backing up both data stored in the database and log data associated with the database. In some embodiments, the service level agreement is defined for the virtual data management system configured to protect the application. In some embodiments, the backup type includes a database backup type, a log backup type, and a composite database backup and log backup type. In some embodiments, a first database backup and a first associated snapshot of the database is received at a first time from a host agent running on a database server when the backup type comprises a database backup type. In some embodiments, a first identifier is assigned to the first database backup and the first associated snapshot, the first identifier including a first composite backup identifier indicative of a first set of database backups and log backups that share a first dependency relationship. In some embodiments, a log backup and a second associated snapshot of the log backup are received at a second time from the host agent running on the database server when the backup type comprises a log backup type. In some embodiments, a second identifier is assigned to the log backup and to second associated snapshot, the second identifier including a second composite backup identifier indicative of a second set of database backups and log backups that share a second dependency relationship, the second composite backup identifier equal to the first composite backup identifier when the first time comprises a most recent prior database backup time to the second time. In some embodiments, a composite database and log backup and a third associated snapshot of the database and the log backup is received at a third time from the host agent running on the database server when the backup type comprises a composite database and log backup type. In some embodiments, a third identifier is assigned to the composite database and log backup and to third associated snapshot, the third identifier including a third composite backup identifier indicative of a third set of database backups and log backups that share a third dependency relationship.

In some embodiments, at least one of the log backup and database backup is expired at a fourth time such that space associated with the log backup becomes available for use by another backup. In some embodiments, expiring the at least one of the log backup and database backup includes receiving an associated expiration request, the expiration request comprising at least one of an on demand request from a user, and a scheduled expiration request based on a service level agreement. In some embodiments, the systems and methods described herein are used for restore and recovery of the database associated with the application. In some embodiments, the second composite backup identifier equals the third composite backup identifier when the third time comprises a most recent prior database backup time to the second time. In some embodiments, the second identifier further includes a fourth composite identifier when the log backup comprises the most recent subsequent log backup to the composite database and log backup, the fourth identifier equaling a fifth composite identifier associated with a prior database backup or composite database backup most recent in time to the composite database and log backup database backup.

In some embodiments, the first identifier further includes a first recovery range indicating a first set of database and log backups available for restoration and recovery. In some embodiments, the first recovery range includes the first database backup. In some embodiments, the second identifier further includes a second recovery range indicating a second set of database and log backups available for restoration and recovery, the second recovery range including the log backup, the most recent prior database backup, and other log backups captured between the second time and a time corresponding to the most recent prior database backup. In some embodiments, the third identifier further includes a third recovery range, the third recovery range including the composite database and log backup and any log backups subsequent to the composite database and log backup associated with the third composite backup identifier.

Embodiments of the present disclosure relate to systems and methods of utilizing multiple threads to facilitate parallel data copying to reduce an amount of time associated with backing up data. In some embodiments, first data indicative of a request to copy one or more file systems associated with an application from a first storage to a second storage is received. In some embodiments, second data indicative of a number of threads available for the backup request is received. In some embodiments, the number of available threads includes at least three available threads. In some embodiments, a first available thread is used to select files from the one or more file systems for backup. In some embodiments, selecting the files for backup comprises adding a first file to a work queue when the first file is different from files associated with the backup storage, adding at least one second file to the work queue when the at least one second file is different from files associated with the backup storage, and creating a plurality of backup work items associated with the work queue files. In some embodiments, a second available thread is used to determine that a first backup work item is available for processing. In some embodiments, the second available thread is used to process the first backup work item work such that a third file associated with the first backup work item is copied from the production storage to the backup storage. In some embodiments at least a third available thread is used to determine a second backup work item is available for processing. In some embodiments, the at least third available thread is used to process the second backup work item work such that a fourth file associated with the second backup work item is copied from the first storage to the second storage, the at least third available thread processing the second backup work item while the second available thread is processing the first backup work item.

In some embodiments, creating a plurality of backup work items associated with the work queue files comprises ordering the backup work items based on a dependency relationship between the work items. In some embodiments, the backup work items include at least one of a create file work item, a copy bytes work item, an update file metadata work item, a create directory work item, a delete file work item, a delete directory work item, and a create symbolic link work item. In some embodiments, the update file metadata work item depends on the copy bytes work item, and the copy bytes work item depends on the create file work item. In some embodiments, the first storage and second storage comprise one of a production storage and a backup storage.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 7 shows a composite backup catalog in tabular form, according to some embodiments.

FIG. 19A is a list of work item types, according to some embodiments.

DETAILED DESCRIPTION

Figure 1:
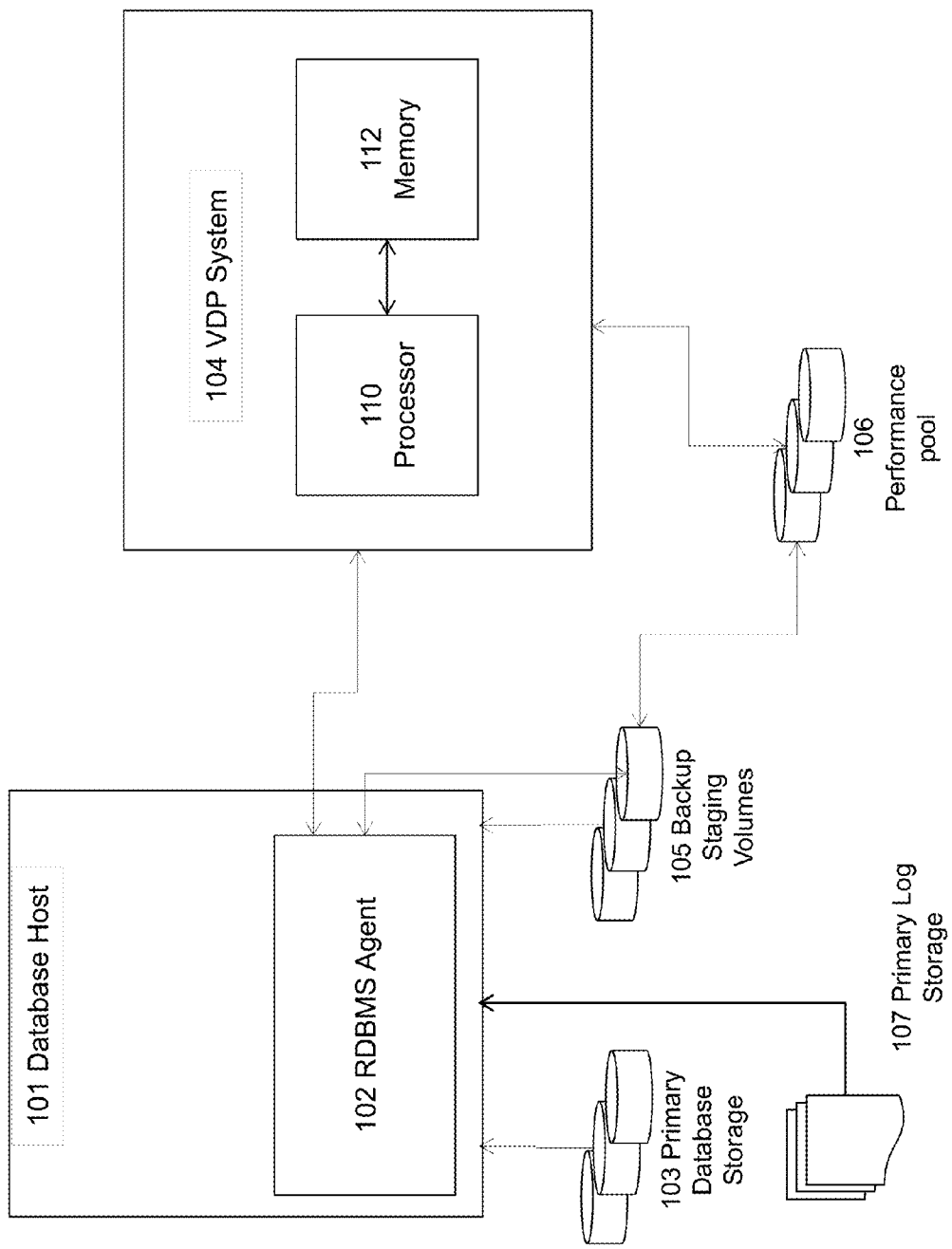
FIG. 1 depicts a configuration of database host protected by a Virtual Data Pipeline system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Integrated Database and Log Backup

Some embodiments of the present disclosure describe features for use with a virtual data management system (e.g., such as a virtual data pipeline, or other application designed to control the flow of backup-related data) to support integrated protection of a database and its transaction logs, their replication, and restore phase of this method. A Data Management Virtualization System such as VDP allows a user to define a Service Level Agreement (SLA) that encodes lifecycle of data managed by siloed Data Management activities such as Backup, Replication and Archiving for each application and then performs these operations automatically as defined in the SLA. Data Management Virtualization System can manage the entire data protection lifecycle, moving data across various storage repositories as needed. Data Management Virtualization System is capable of tracking changes to production data over time and then use that information for incremental data duplication and compression. Data Management Virtualization System can virtualize physical storage resources and can provide instant access to data managed by the system. It acts like a virtualized storage system in that case.

Embodiments described in this disclosure allows protection of databases and/or transactional applications using separated-yet-coupled data and log backup streams with improved performance, space efficiency, clear and/or easy cloning/branching/restoring/etc. workflows. Some embodiments allow a Virtual Data Pipeline (VDP) to protect a database and its log in a single Service Level Agreement (SLA), which may contain different policies to backup database files and log files on different schedules. For space efficiency, data files and log backup can also be set with different expiration schedule, as data ages, log can be expired early and space reclaimed. In general, expiring a backup makes available the space associated with the backup for use by another backup (e.g., to be overwritten by another backup). For example, expiring a backup can include deleting a point in time image associated with the backup such that the space associated with the point in time image is available for use.

With the present disclosure, it is possible to protect databases and logs under a single SLA with different backup schedule to achieve desired RPO. The Virtual Data Pipeline maintains the relationships between data backups and its dependent log backups. Mounting a database backup automatically includes mounting of its dependent log backup. Restore of a database backup will restore data files followed by recovery using available log backups to achieve point-in-time-recovery (PITR).

FIG. 1 depicts a configuration of database host 101 protected by Virtual Data Pipeline system 104. Database host 101 has primary database storage 103 and primary log storage 107. Primary database storage 103 is where data files of the database are located. The data files in the primary database storage 103 can change over time. The primary log storage 107 hosts database logs. Proper management of both storage areas can ensure the smooth operation of the database. The database can stop functioning if either storage areas run out of space. The primary database storage 103 and primary log storage 107 can share the same storage volume, but they often use separate storage volumes. In some embodiments, using separate storage volumes is often a best practice recommended by database vendors.

A relational database management system (RDBMS) agent 102 facilitates the backup, mount, and restore operations between Virtual Data Pipeline system (VDP) 104 and protected database host 101. The RDBMS agent 102 is in communication with the VDP system 104. The VDP system 104 is in communication with performance pool 106. The configuration also includes backup staging volumes 105 that are mounted on the host to be protected 101 during backup, and in communication with the RDBMS agent 102; the staging volumes 105; where database and log backups are kept, are created out of the performance pool 106. Performance pool 106 is a storage pool area provided by VDP for backup operations. VDP is a copy data platform that provides efficient management of copy data in a user environment. VDP manages the data protection life cycle, moving data across the various storage repositories. VDP includes a processor 110 connected to memory 112. As explained in more detail below, memory 112 includes computer-readable instructions that cause processor 110 to perform management of copy data for VDP 104. The Virtual Data Pipeline is described in more detail in U.S. application Ser. No. 13/920,950, filed on Jun. 18, 2013, entitled "System and Method for Intelligent Database Backup," the disclosure of which is herein incorporated in its entirety.

Figure 2:
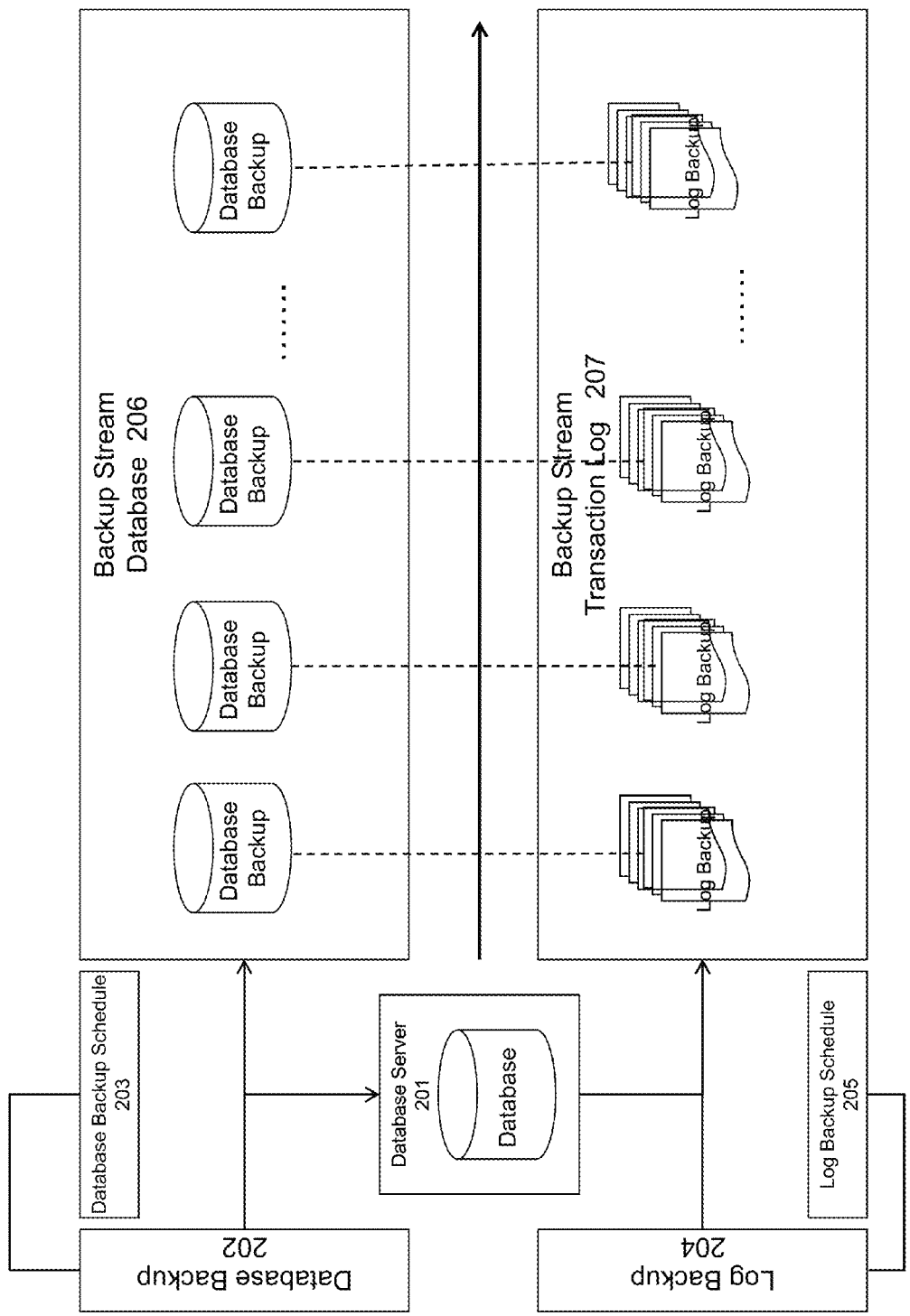
FIG. 2 is a system diagram depicting a traditional backup operation.

FIG. 2 is a system diagram depicting a traditional backup operation. FIG. 2 shows an implicit dependency between database backup stream 206 and log backup stream 207 when protected under separate schedule of database 203 and transaction log 205. For database 201, database backup 202 and its schedule 203 drive the database backup; transaction log backup 204 and its schedule 205 drive the transaction log backup. Database and transaction log backups generate two backup streams separately for database 206 and transaction log 207. For example, database backup can schedule 203 runs every 24 hours to backup database data files. Transaction log backup can schedule runs every 4 hours to backup transaction logs. In this example, there would be 6 transaction log backups for every database backup. These 6 transaction log backups would depend on the database backup.

Figure 3:
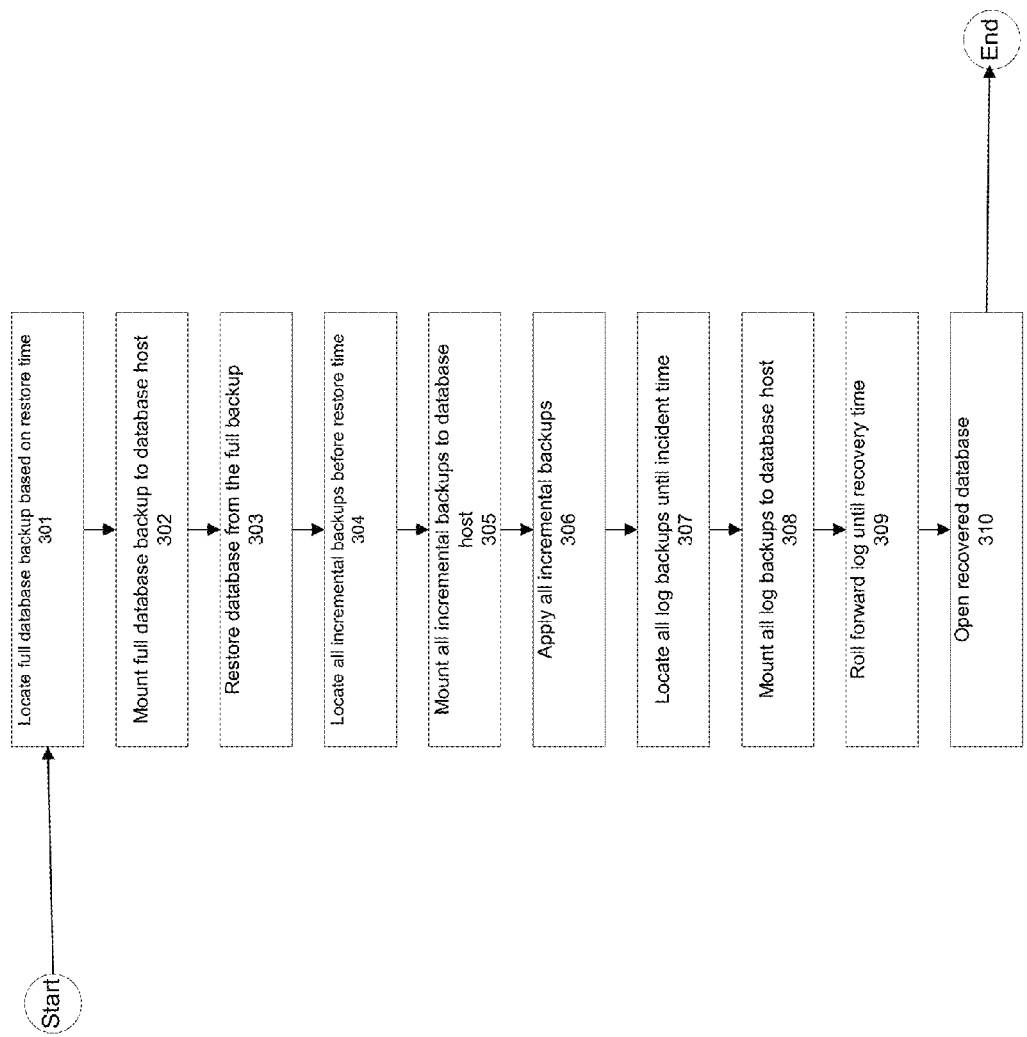
FIG. 3 is a flowchart illustrating a traditional process of database recovery using log backups.

FIG. 3 is a flowchart illustrating a traditional process of database recovery using log backups. First, a full database backup is located based on required restore time 301. Locating the full database backup is accomplished by looking at database backup repository. Once a desired full database backup located, the full database backup is mounted to the database host 302. Restore operation on database from the mounted full database backup is performed in step 303. After the datafiles from full backup are restored, all subsequent incremental database backups before required restore time are located 304. Next, all incremental database backups are mounted in step 305 and datafiles from incremental database backups are restored in chronological order in step 306. Once datafile restore completes, all log backups up to required restore time are located in step 307. Next, all log backups to the database host are mounted in step 308. All the log backups until recovery time are applied in step 309. Once all the above steps are completed, the recovered database can be opened 310.

For example, when a database is protected with weekly full database backup on Sunday, and daily incremental database backup on weekdays, log backup is done very two hours. If an incident happens on Thursday 9 am, and needs a restore from backups, one has to locate Sunday's database backup (full), restore it, locate incremental database backups from Monday, Tuesday, Wednesday, restore all three incremental backups, locate log backup of Thursday morning from 00:00 hr to 09:00 hr, and apply all available logs to 9 am before recovering the database before the incident time.

Figure 4:
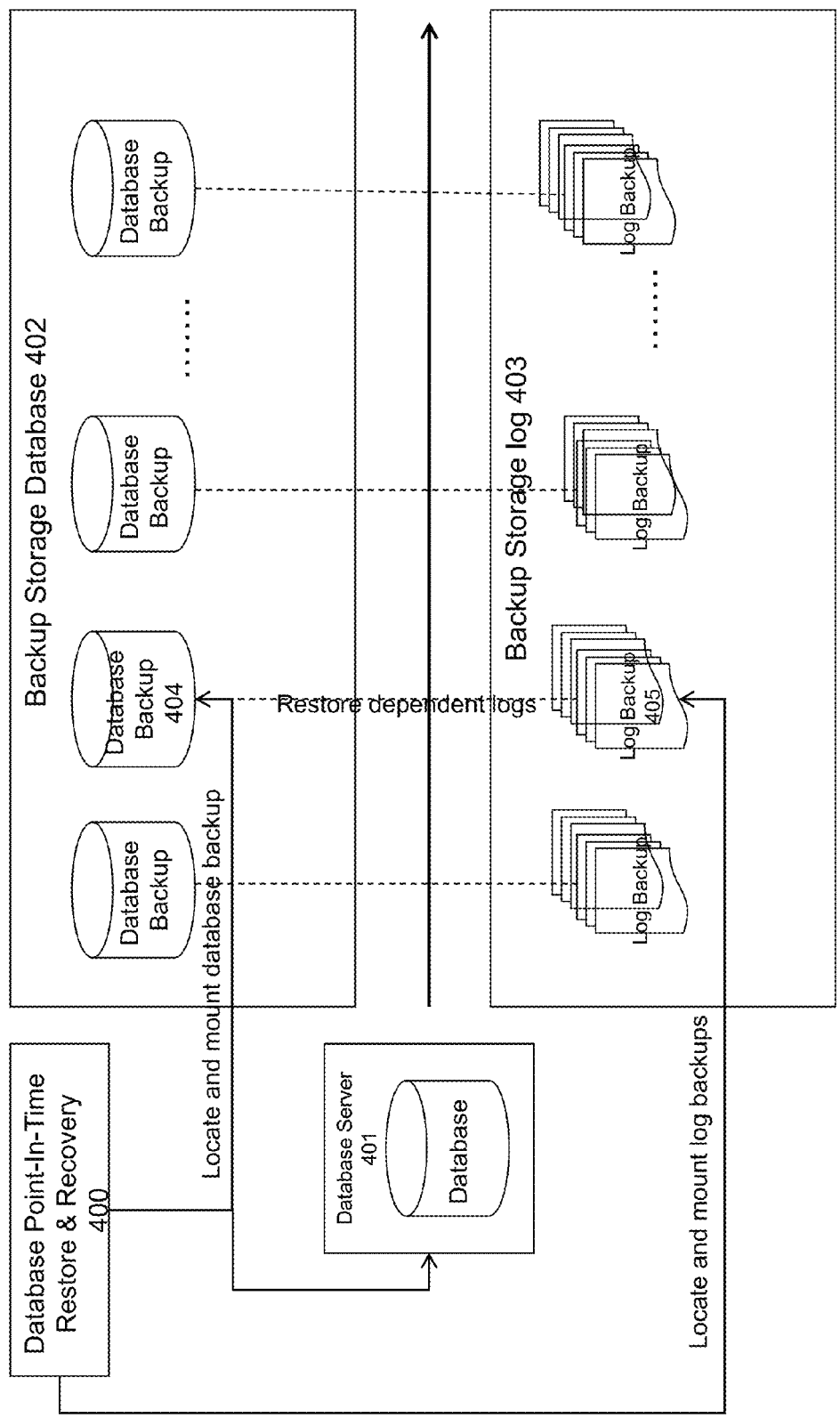
FIG. 4 depicts a restore of database to a point-in-time using database backups from database backup storage with log backups from log backup storage to database server.

FIG. 4 depicts a restore of database to a point-in-time 400 using database backups from database backup storage 402 with log backups from log backup storage 403 to database server 401. The database backup in database backup storage 402 and log backups in log backup storage 403 are generated by two separate schedules, and have implicit dependency between the two backup streams. For example, database backup happens every 24 hours thus generating a database backup copy every day in database backup storage 402; log backup happens every 4 hours thus generating 6 log backups every day in log backup storage 403. A specific log backup 405 represents 6 log backups for a day, compared to the database backup 404 representing one database backup for a day. The implicit dependency is transformed to an explicit dependency in order to successfully perform point-in-time-recovery using log backup 403 after a database backup from database backup storage 402 is restored to database on database server 401. A common scenario for restore this database to a point-in-time is to restore the database data files to database server 401 from the database backup 402 by locating the nearest database backup 404 before the point-in-time; then find all log backups 405 in log backup stream 403 up to the one containing point-in-time required for the recovery.

Figure 5:
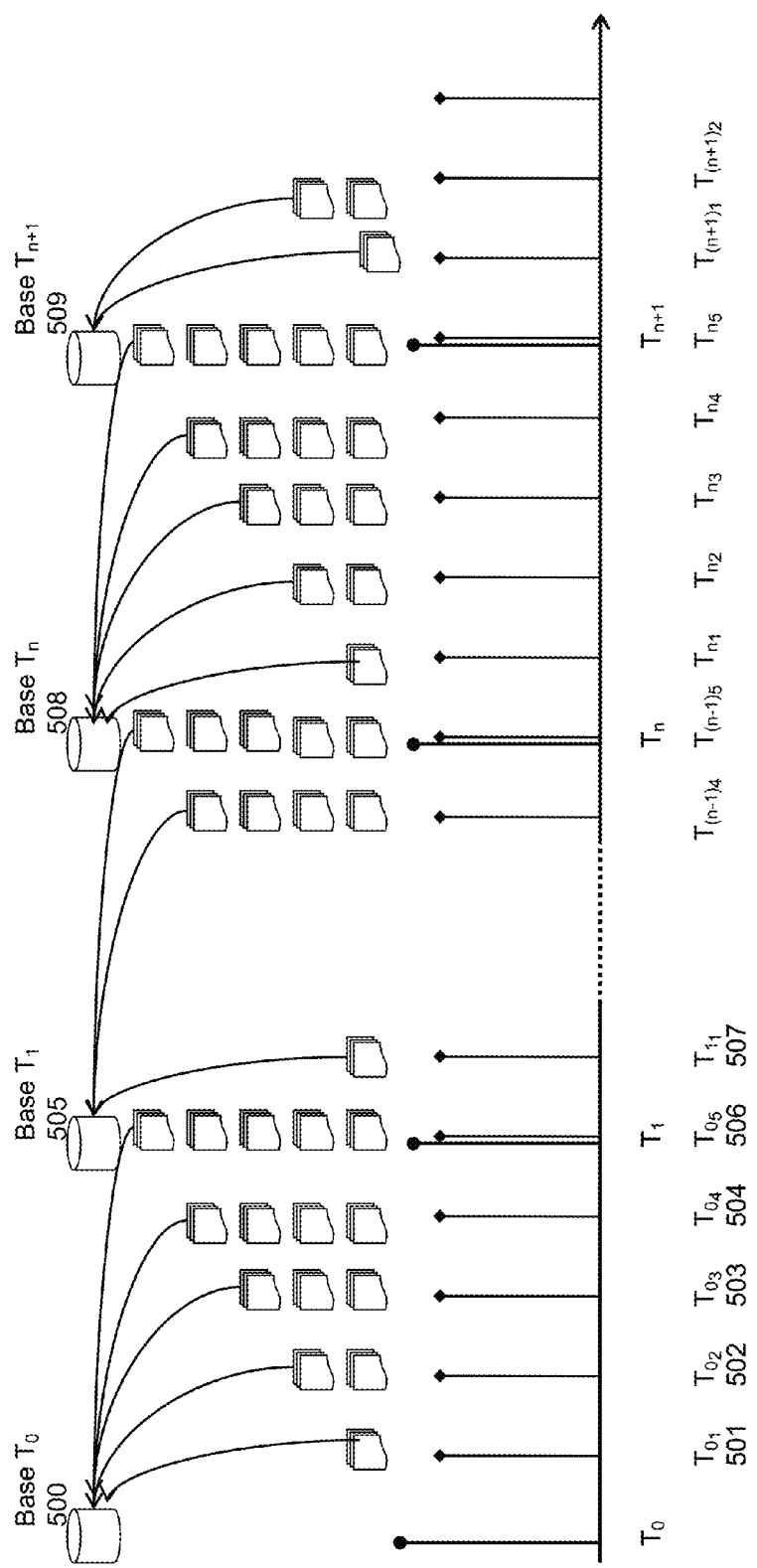
FIG. 5 illustrates an integrated database and log backup, according to some embodiments.

FIG. 5 illustrates an integrated database and log backup, according to some embodiments. As shown in FIG. 5, the implicit dependency has become explicit. Each log backup has an associated base database backup it depends on. Database and log backups run on different schedules. As time moves forward, database backup occurs and log backup resets its dependent base database backup. Log cleanup also takes place after new baseline is established. The baseline database backup on which log backup depends is denoted as Base T0 500. Log backup takes place at shorter interval 501, 502, 503, and 504. The log backups are made such that there are not gaps from 501 to 502, from 502 to 503, from 503 to 504. Briefly, a gap refers to a missing transaction in a log. For example, transaction associated with a database are numbered sequentially and a log backup includes a subset of the sequentially numbered transactions. A gap occurs when one of the log backups is missing such that one or more of the sequentially numbered transactions are missing. Database backup takes place at time Base T1 505. Right after Base T1 database backup, a log backup follows 506, which covers the log from the end of log backup 504 to after the database backup 505 so that there is no gap among log backups. The very next backup is log backup 507; this log backup will conduct a cleanup on the log backup staging disk before performing log backup from end of database backup 505 to current time 507. For example database backup is scheduled to run every 24 hours (daily); log backup is scheduled every hour on the hour. Once daily database backup completes, all log backups of that day will be using this database backup as a baseline, with VDP keeps this association between the database backup and log backups in its metadata repository.

Figure 6:
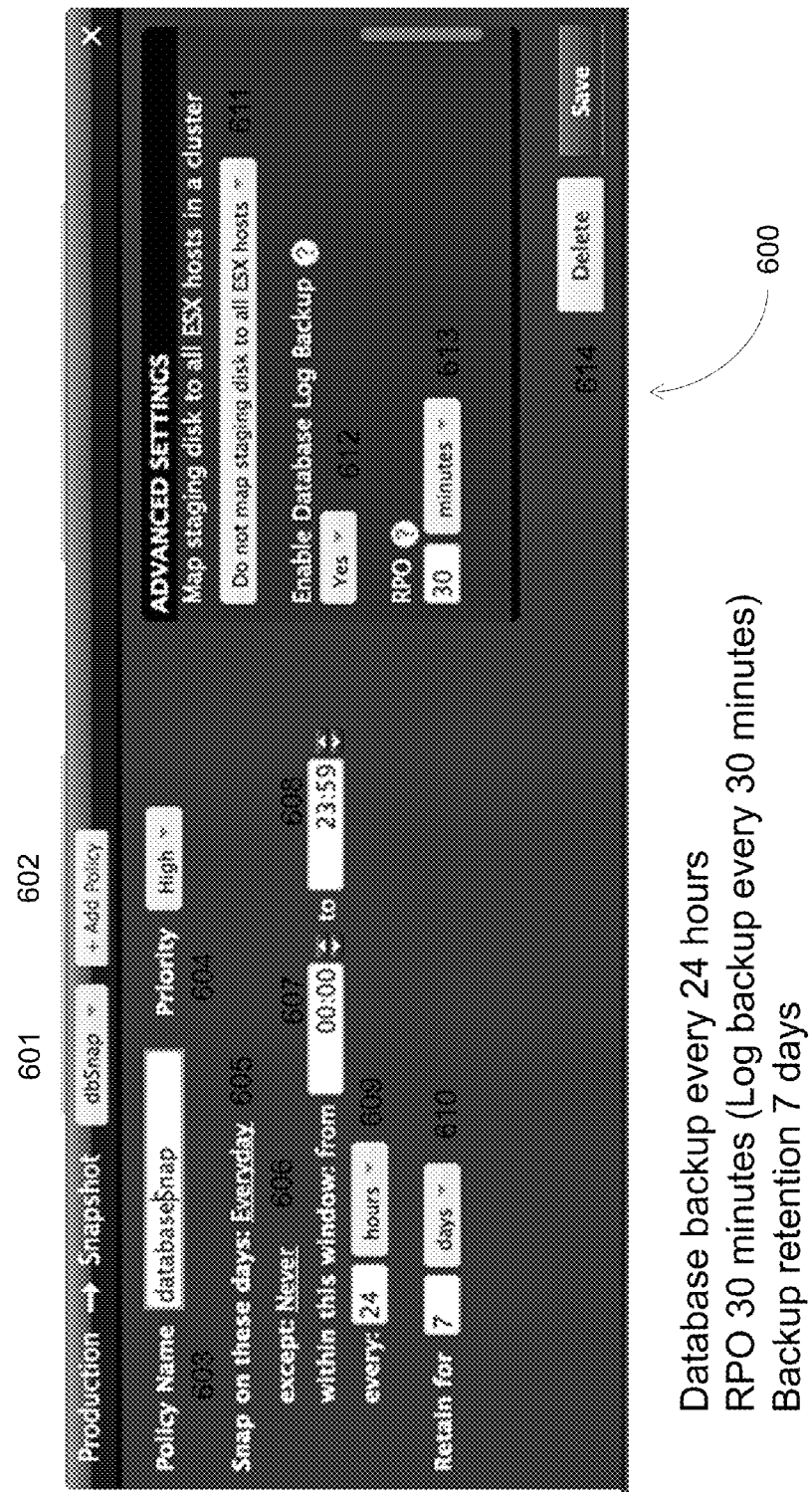
FIG. 6 depicts a user interface for configuring single SLA protecting database with its log on different schedule, according to some embodiments.

FIG. 6 depicts a user interface for configuring a single SLA protecting a database with an associated log on different schedule, according to some embodiments. The user interface 600 includes facility to add new policy for the SLA template using button 602. A Snapshot policy of dbSnap of 601 as an example, it has a name field 603, with a priority level 604. This Snapshot policy states that a database backup will run every day 605 with exception setting 606 and operating window start time 607 and end time 608. The backup will run every 24 hours specified by 609, and the backup image is retained for number of day specified by 610. This user interface for configuring an SLA 600 also provides Advanced option settings. Selection list Enable Database Log Backup 612 can enable the integrated log backup with database (referred to herein as LogSmart); the RPO field 613 specifies log backup runs every 30 minutes when database log backup is enabled. For example, using SLA template in FIG. 6, both database and log backup can be retained for 7 days. This SLA can result in 48 number of log backups, and consume large number of disks in Virtual Data Pipeline. Some embodiments of the present disclosure also describe inline expiration for log backups. Inline expiration is a mechanism that can automatically expire an older log backup once a new log backup is taken for the same baseline database. In some embodiments, the log backup is cumulative between two database baselines. A log backup cleanup facility can run at a log backup interval after a new database backup baseline is established. With this technique, log backup between two daily database backups can be reduced to 1, yet maintaining continuity of the logs.

FIG. 7 shows a composite backup catalog in tabular form as result of running LogSmart SLA template, according to some embodiments. A composite backup catalog includes a Backup ID 702, which is a primary key for the backup record. Composite Backup ID 704 is used to associate database backup record and log backup records. Backup Time 706 field stores the backup completion time, which is used to identify a backup record during restore. Backup Type 708 indicates the type of the backup record, which can be either database or log. Recovery Range 710 indicates the range of time availability of log backups to roll forward and Expiration Time 712 defines the expiration time for a backup. For example, backup record 1000 is a database backup, with its Composite Backup ID 704, and it is associated with backup records 1001, 1002, . . . 1047, 1049, which are type of log backup as defined by Backup Type 708. The Recover Range 710 of record 1000, is from the first log backup 1001 to the log backup 1049. In some embodiments, the design of log backup record 1049 overlapping database backup 1048 is to guarantee there is no gap among log backups even across database backup where a new baseline is established.

Figure 8:
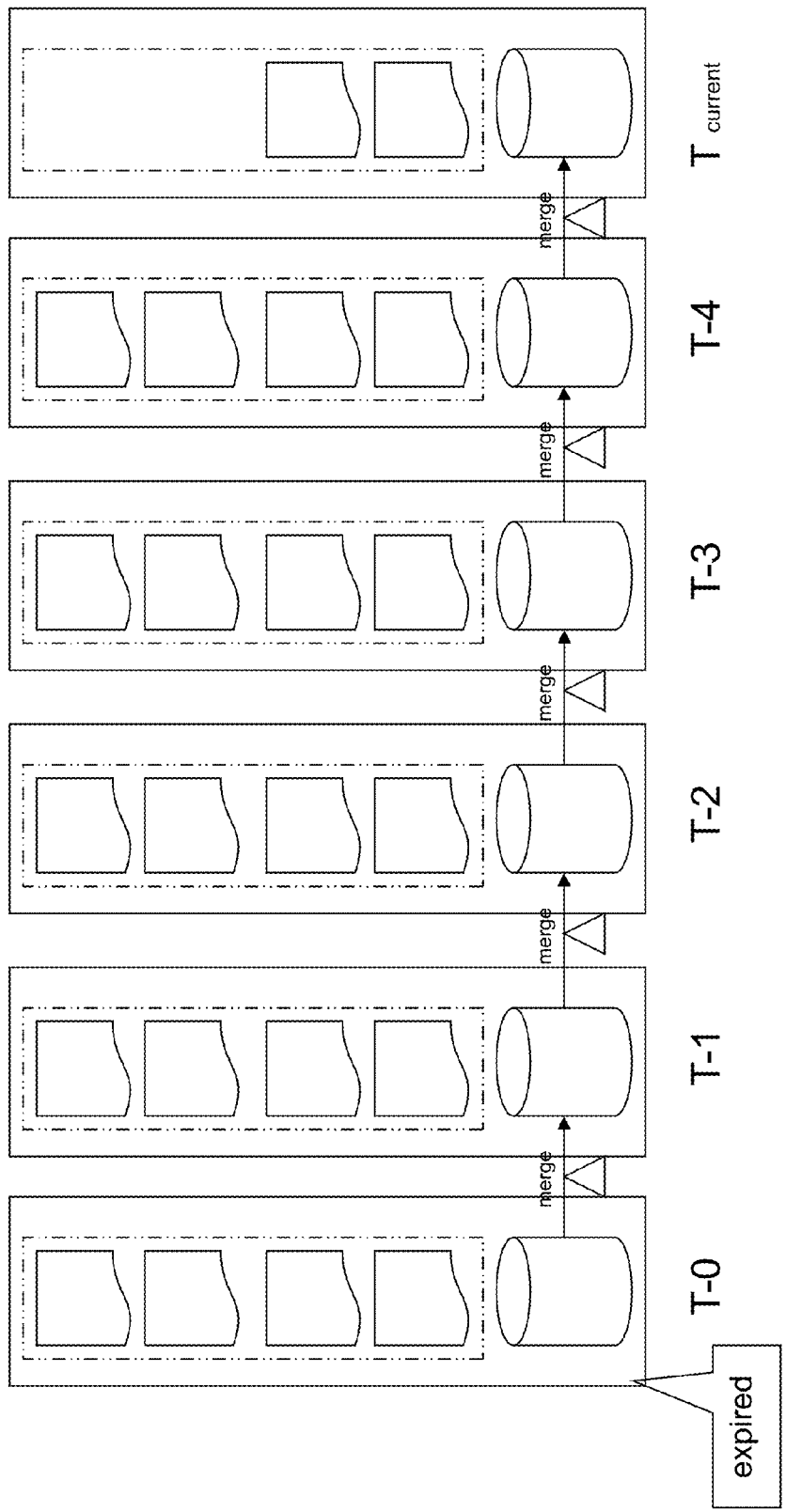
FIG. 8 illustrates composite backup of database and log, according to some embodiments.

FIG. 8 illustrates composite backup of database and log, according to some embodiments. Each database backup can be incrementally merged to make a synthetic full backup, with older composite backup expired (T-0). Log backup takes place between two database backups. The incremental merge to make a synthetic full can be accomplished through a tracking of changed blocks between two database backups, and merge the changed blocked to the database backup after initial full database backup. As described in FIG. 6, each database backup can have a unique composite ID, which is generated by VDP automatically and transparent to end user. Any log backups that are depending on this database backup also have the same composite ID so that when restoring all relevant backup images are located and presented to database host. As backup data ages, database and dependent log backups can be expired together.

Figure 9:
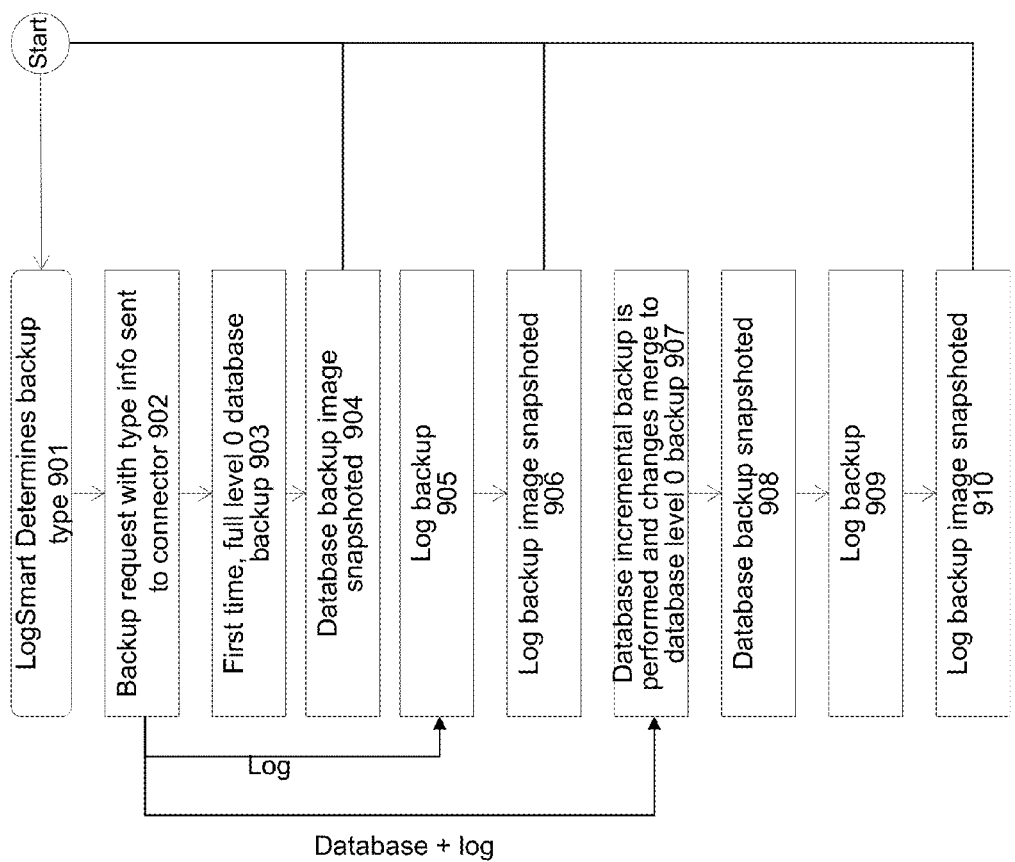
FIG. 9 is a flowchart illustrating the flow of a composite database backup, according to some embodiments.

FIG. 9 is a flowchart illustrating the flow of a composite database backup, according to some embodiments. At step 901, Virtual Data Pipeline determines whether an SLA is LogSmart enabled. If an SLA LogSmart is enabled, VDP then determines the type of the composite backup. The composite backup is a database if it is a first time backup. If a database backup baseline exists, VDP determines based on SLA template properties as detailed in FIG. 5 to determine whether the type is a database or log. Once VDP decides whether the type is database or log, this type is sent in step 902 to host agent 102 to request a backup on the database.

When the backup type is Database, at step 903 host agent 102 takes a full backup of the database for first time backup, this backup is followed by snapshot of this backup at step 904. A unique composite backup ID is generated by VDP to tag this backup record and to be used on subsequent log backup records that use this database backup as baseline, the backup type is set to database in the backup repository.

If the backup type is log only, log backup will be taken at step 905 and snapshot at step 906. The composite backup ID from the nearest database backup, which this log backup uses as baseline, is assigned to the log backup record, and backup type is set to log in backup data repository.

If the backup type is database plus log, an incremental database backup is performed with merge done at step 907 and snapshot at step 908. A new composite backup ID is generated and tagged on this database backup in backup repository.

A log backup follows the database backup in step 909 and snapshot at step 910. Since this log backup is part of database plus log backup, it uses the composite backup ID not from a proceeding database backup, but the composite backup ID of a previous database backup. In some embodiments, this special consideration allows for no gaps among log backups when across database backups. The log backup covers from last backup for all logs generated. Maintaining continuous of log backups (no gap between log backup) is not only important for log recovery, but also allows recovery across database backups using log backup.

This sequence is repeated the next time a schedule kicks in based on the SLA definition. These backups are cataloged after each snapshot and relationship between baseline backup and log backup updated in VDP metadata repository. The available backups are presented for mount and restore operations.

Figure 10:
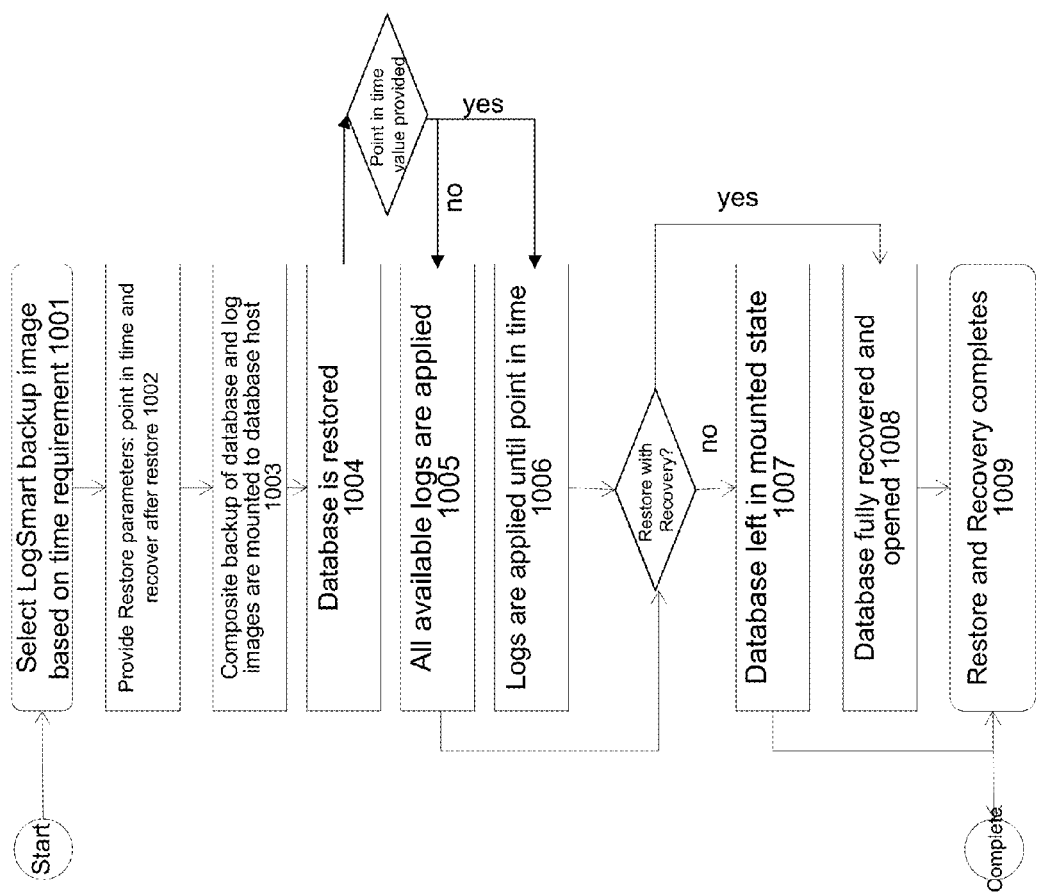
FIG. 10 is a flowchart illustrating a single click restore operation using composite backup of database and log, according to some embodiments.

FIG. 10 is a flowchart illustrating a single click restore operation using composite backup of database and log, according to some embodiments. Each backup image has a backup time and a recover range displayed to end user. A backup image is selected for restore based on restore requirement at step 1001.

Restore parameters such as recovery time and user credentials are prompted, with an option of opening a database at the completion of the recovery at step 1002. The restore parameters are passed to host agent 102.

Composite backup with database and log backups are presented to the database host at step 1003. Presentation of the database host include both database and log backups, so that the restore can be completed in single step comparing to prior art of multiple steps of locating and mounting database and log backups.

Datafiles are restored to the original location from database backup in step 1004. After restoring datafiles in step 1004, all log backups can be applied if no point in time recovery time is provided in step 1005.

In case of point-in-time recovery is requested, step 1006 recovers the database until the point-in-time specified using the log backup presented to the database host.

If additional steps are needed on the restored database, step 1007 leaves the database in recovery or mounted state so that user can perform additional operations on the restored database. Otherwise the restored database can be opened fully recovered in step 1008 and the restore and recovery process is complete 1009.

Figure 11:
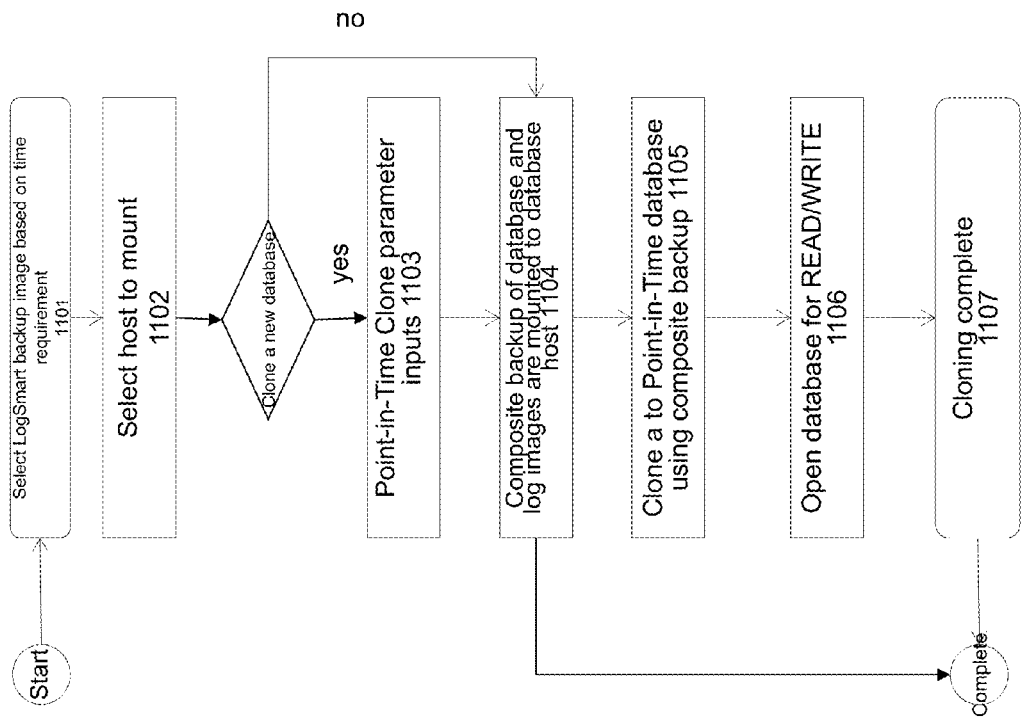
FIG. 11 illustrates a workflow of instance mounting composite database and log backup for point-in-time clone or branching, according to some embodiments.

FIG. 11 illustrates a workflow of instance mounting composite database and log backup for point-in-time clone or branching, according to some embodiments.

A backup image is selected for cloning based on point-in-time requirement in step 1101 by looking at the backup time and log recovery range of the backup image. A point-in-time requirement can include the time where production database needs a clone.

In step 1102 a host from test and development environment is selected as cloning destination to mount backup images.

Clone and point-in-time parameters are prompted to set until time in step 1103 including new database name and new database configuration settings. These parameters are passed to host agent 102 on the target host.

Step 1104 mounts both database and log backup images to the target host.

When a clone of the database is required, step 1105 can use the clone parameters to clone a new database and perform point-in-time recovery on the target host.

Step 1106 includes opening the newly cloned database. The new cloned database can have read/write capability. For example, a cloned Oracle database running from database backup mount is in READ/WRITE state where user can start reading from existing tables and ingest new data into the cloned database.

This cloning or branching capability of VDP can provide instant availability of cloned database regardless the size of the database being cloned or branched. Instant availability includes providing access to a cloned database instantly after the clone from production database backup completes.

Figure 12:
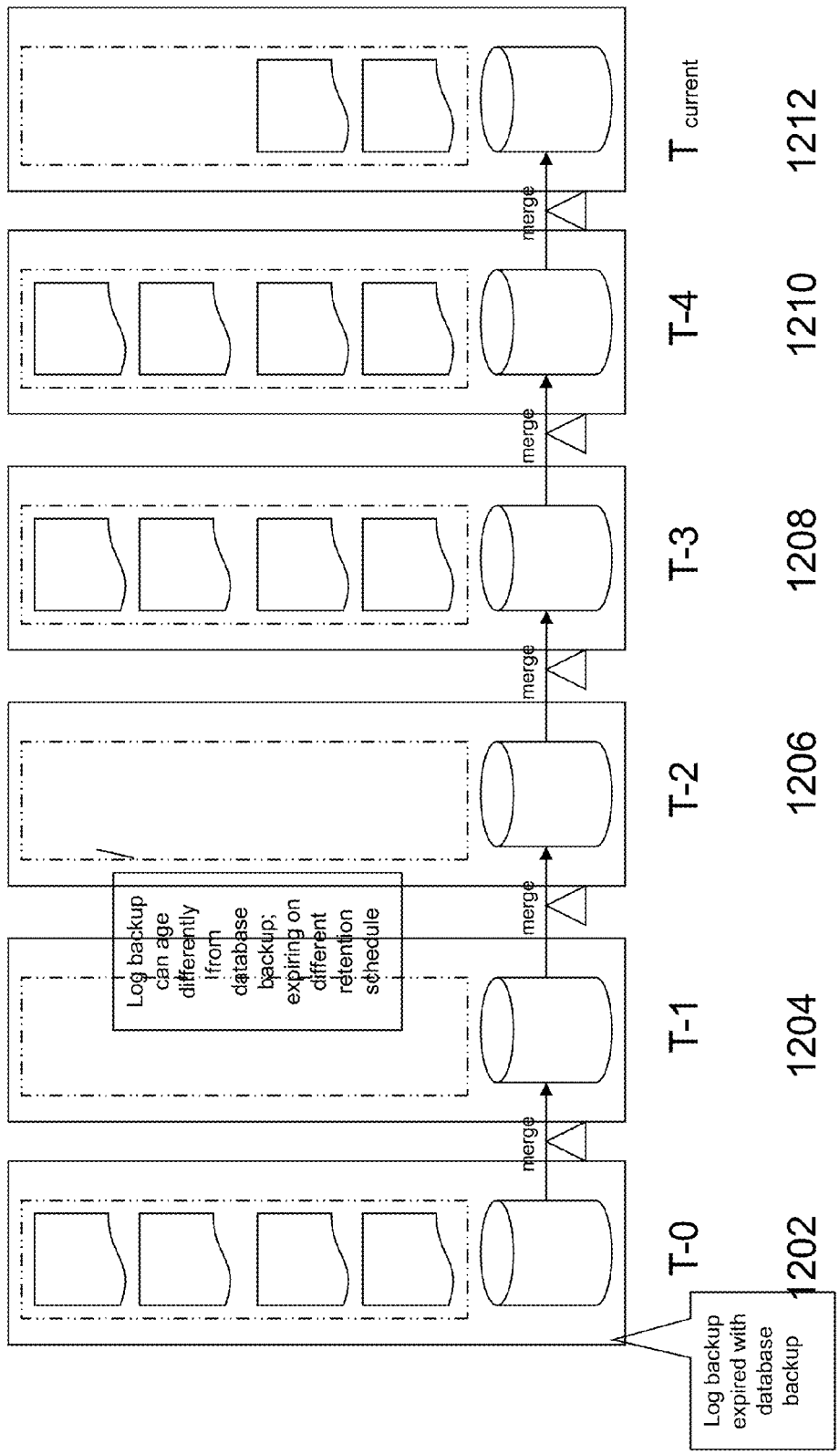
FIG. 12 illustrates database and log composite backup lifecycle management for resource efficiency by expiring log backup image on a different schedule from that of database backup, according to some embodiments.

FIG. 12 illustrates database and log composite backup lifecycle management for resource efficiency by expiring log backup image on a different schedule from that of database backup, according to some embodiments. When data ages, the demand for point-in-time restore & recovery diminishes, log backups can be expired earlier than database backup to free up space. This lifecycle management on different expiration schedules for database and log backups is realized by setting different expiration time (712 in FIG. 7) for database backup and log backup. The VDP system can use the expiration time to expire the backups beyond the expiration. Backups at T0 have already passed expiration date for both database and log defined by SLA and being expired with space reclaimed 1202. Database backup at T1 has not passed its defined expiration, but log backup has and log backup has been expired 1204. Log backup of T2 also past expiration date and expired 1206. None of database and log backups of T3 and T4 expired and remain in backup storage 1208 and 1210.

Multi-Threaded Copying

Applications usually store application data in files on a File System on Production Storage. An application can store application data in a single file or as many files as application chooses to. A backup application copies these application data files to backup storage during backup operation. The number of files backup application needs to copy depends on the application that is being backed up. For example, for an SQL Server database, a backup application may need to copy a few files whereas for a file system backup, a backup application may need to copy millions of files.

It can be important for backup applications to minimize the time required to backup an application. For example, minimizing backup time for an application can be advantageous to meet a designed business Service Level Agreement. There can be other requirements such as capping I/O throughput or network bandwidth consumption to a certain level. The techniques described herein provide for backup of files using multiple threads and work items to manage distribution of backup features across the threads.

Figure 13:
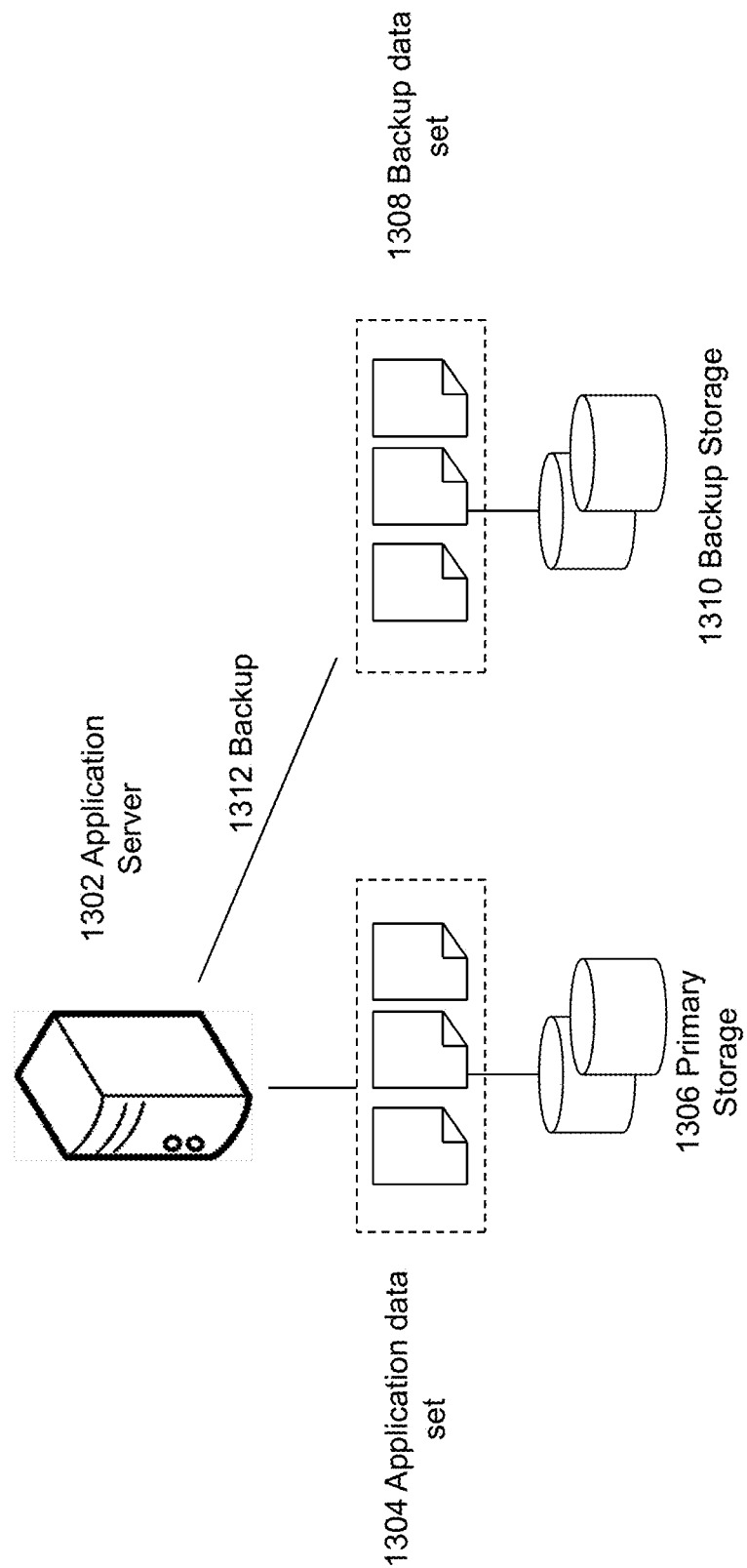
FIG. 13 is a system diagram showing a backup application, according to some embodiments.

FIG. 13 is a system diagram showing a backup application, according to some embodiments. Application data files 1304 are stored in file system on Production Storage 1306. Backup application 1302 makes copy 1308 of application data files 1304 onto backup storage 1310 during backup operation 1312. In some embodiments, backup application uses a copy data platform (also referred to herein as VDP).

In some embodiments, VDP is a copy data platform that provides efficient management of copy data in a user environment. VDP manages the data protection life cycle, moving data across the various storage repositories. VDP includes a processor 1310 in communication with temporary and/or permanent memory 1312. As described in more detail below in the description accompanying FIG. 20, memory 1312 stores instructions and is configured to cause the processor 1310 to perform the subject matter described herein. The Virtual Data Pipeline is described in more detail in U.S. application Ser. No. 13/920,950, filed on Jun. 18, 2013, entitled "System and Method for Intelligent Database Backup," the disclosure of which is herein incorporated in its entirety.

In some cases, a set of application data files for the application that is being backed up is known upfront. In those cases, backup application can start copying the files right away. However, there are situations where application data files are not known upfront. In that case, backup application needs to scan entire file system to identify files that need to be copied. Scanning the file system is typically a slow operation.

Figure 14:
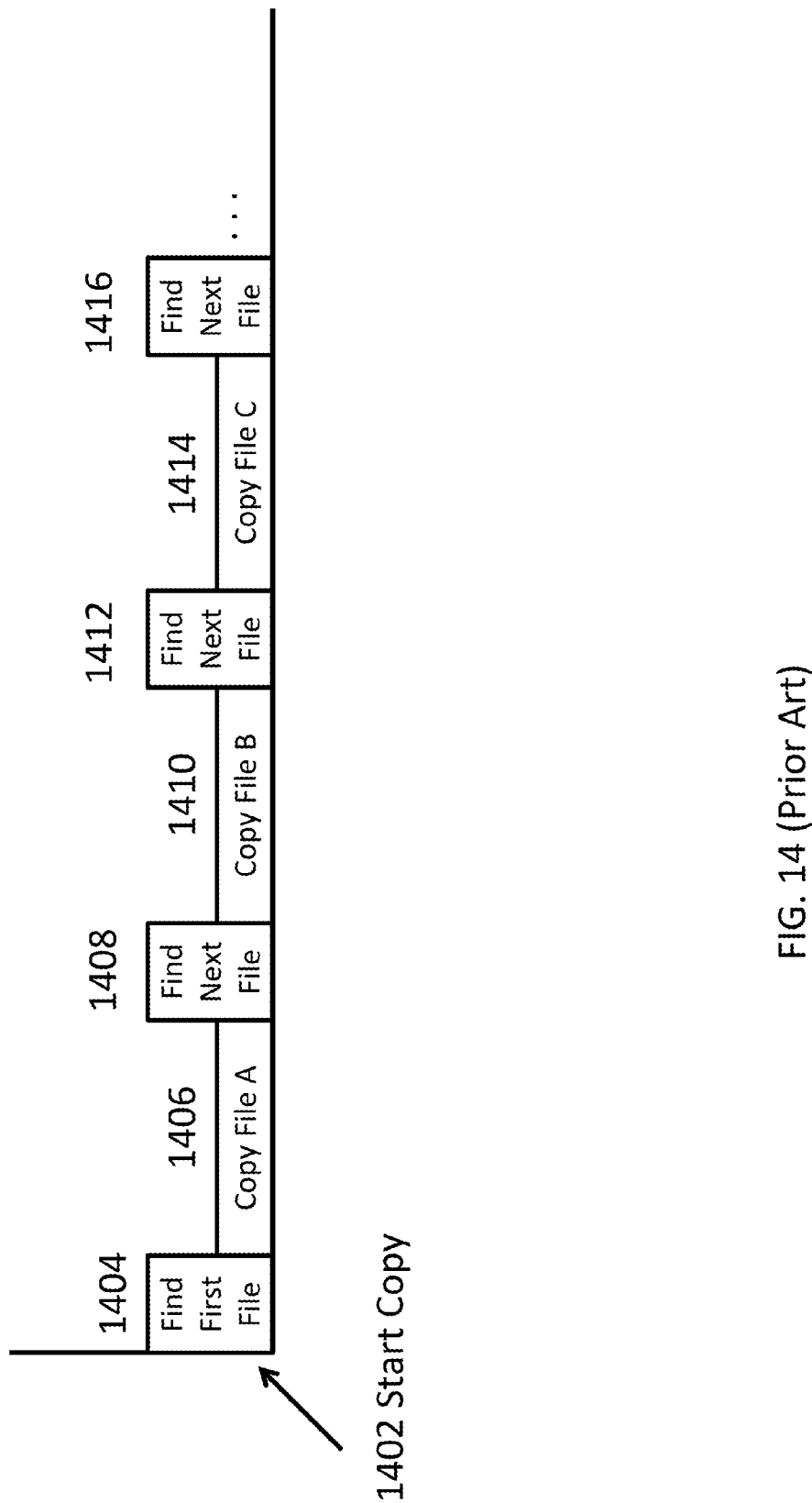
FIG. 14 is a diagram illustrating a single threaded computerized copy operation.

FIG. 14 illustrates a single threaded computerized copy operation. During a backup operation, backup application finds a file to copy 1404. Once it identifies a file to copy, backup application copies 1406 the file to backup storage. Once the copy for the first file is complete, backup application finds the next file 1408 to copy and then backup application copies 1410 the next file. This sequence continues until all the application files are copied to the backup device.

This single threaded copy operation can have one or more disadvantages. Due to the serial nature of copy operation, the time required to complete the backup can be long and can require a longer backup window. The long backup time may result in missed Service Level Agreement (SLA) for business. The single threaded copy may result in underutilization of resources on the application server as well as underutilization of IT infrastructure. The time required to backup with single threaded copy gets worse with higher network latency and number of files to copy. High network latency results in backup application just waiting most of the time for copy operation to complete before it can look for next file to copy.

Figure 15:
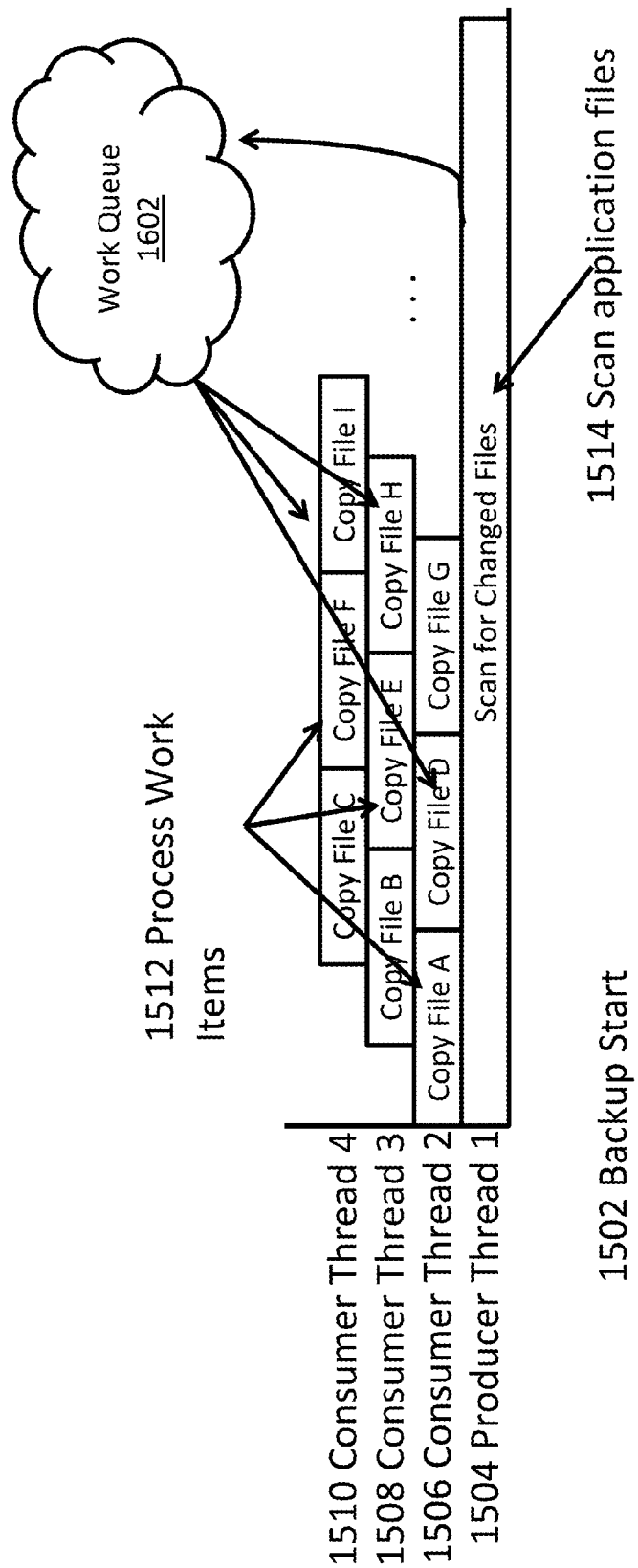
FIG. 15 is a diagram illustrating a multi-threaded computerized copy operation, according to some embodiments.

FIG. 15 is a diagram illustrating a multi-threaded computerized copy operation, according to some embodiments. As shown in FIG. 15, multiple threads 1504, 1506, 1508 and 1510 are in use, each thread performing a specific type of operation. For example, there can be one or more threads that scan the file system to identify files that need to be backed up and create backup work items. These threads are referred to herein as work item Producer Threads. There are threads that process work items created by Producer Threads that result in copying of files from Production Storage to Backup Storage. These work item processor threads are referred to herein as Consumer Threads.

When a backup operation starts at step 1502, Producer Thread 1504 scans one or more file systems 1514 to identify files that need to be copied as part of the backup operation (e.g., files that have changed since the last backup). Producer thread 1504 creates backup work items 1512 and queues them up in a work item queue, which is described in more detail in FIG. 16. Available Consumer Threads 1506, 1508, and 1510 pick up work items to process 1512 from the queue. Processor and Consumer Threads 1506, 1508, and 1510 are performing work in parallel and thus utilizing available resources.

Figure 18:
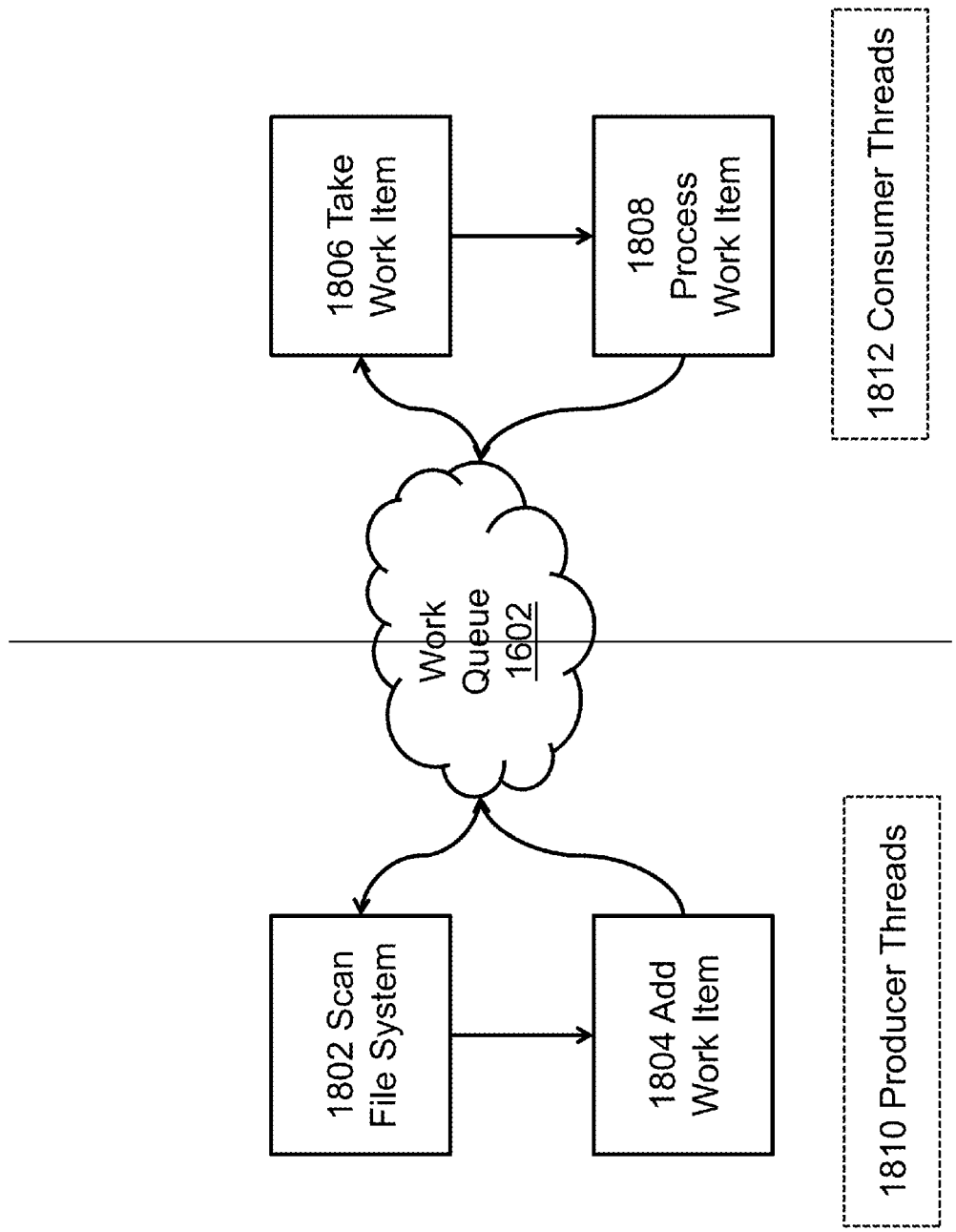
FIG. 18 is a flowchart illustrating a multi-threaded computerized copy process, according to some embodiments.

FIG. 18 is a flowchart illustrating a multi-threaded computerized copy process, according to some embodiments. The left side of FIG. 18 shows work performed by Producer Threads 1810 and the right side of FIG. 18 shows work performed by Consumer Threads 1812. In some examples, there can be one or more Producer Threads 1810 and a one or more Consumer Threads 1812. Producer Threads 1810 identify files that need to be backed up by scanning file system 1802 (or identified using some other application specific mechanism) and producing backup work items that can be processed by Consumer Threads 1812. Producer Threads 1810 add 1804 newly created work items to work item queue 1602. When a new work item is created and added to work item queue, Producer Threads 1810 notify Consumer Threads 1812 that there are work items queued up for processing. A Consumer Thread 1812 checks the work item queue when notified by the Producer Thread 1810, picks up a work item from the queue 1806 and processes the work item 1808. This continues until all the work items in the queue are processed. When Producer Threads 1810 complete identification of files to backup and Consumer Threads 1812 complete processing of all work items created by Producer Threads, the copy operation is complete.

Figure 16:
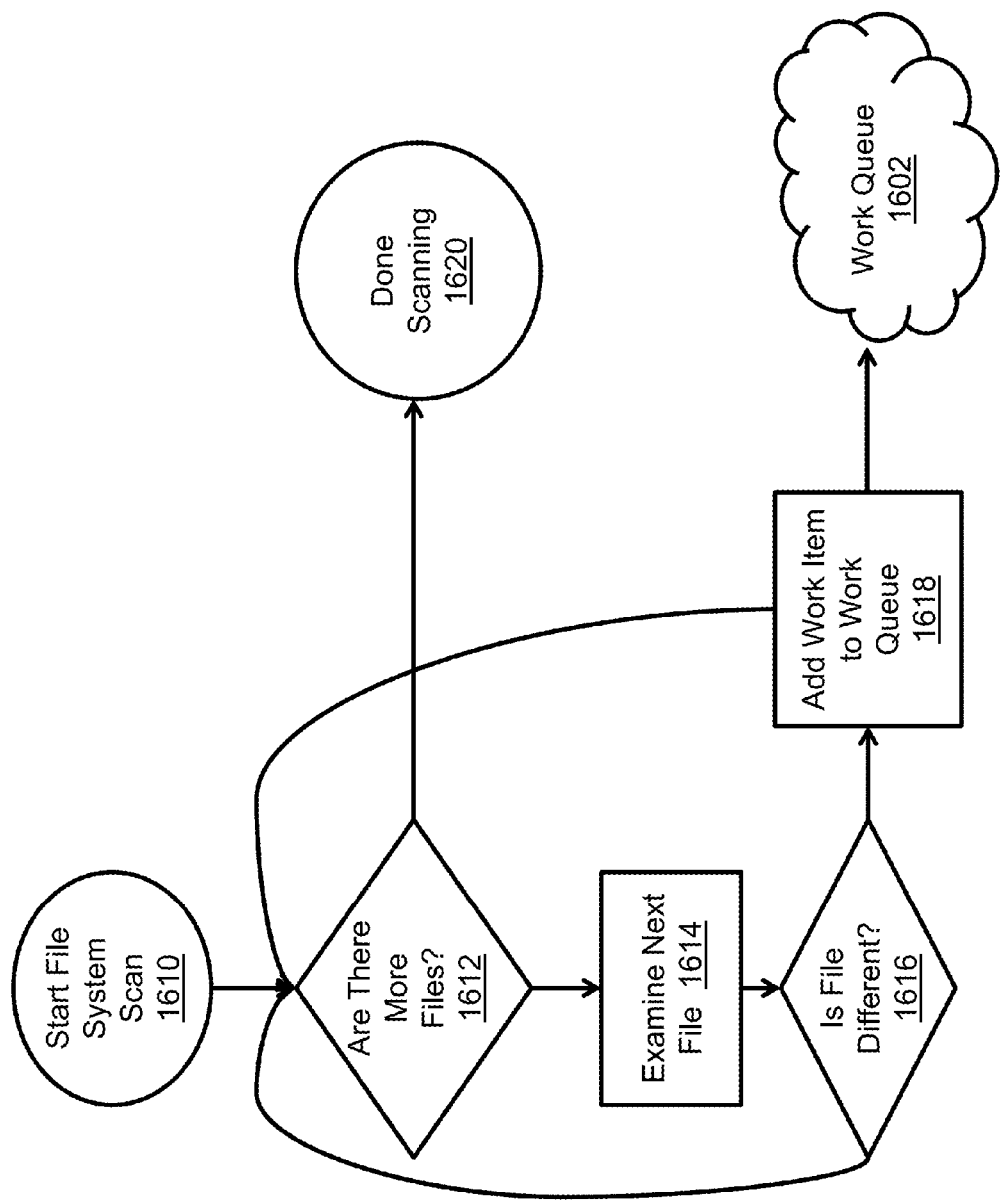
FIG. 16 is a flowchart illustrating a computerized workflow for a Producer Thread work item, according to some embodiments.

FIG. 16 is a flowchart illustrating a computerized workflow for a Producer Thread work item, according to some embodiments. One responsibility of Producer Thread is to identify files that need to be backed up and produce work items for other threads to process. According to some embodiments, a Producer Thread starts a file system scan to identify files to be copied at step 1610. At step 1612, the Producer Thread checks if there are more files in the file system that it needs to process. If there are, the Producer Thread picks the next file 1614 and checks if the file is different from what is on the backup device at step 1616. In some embodiments, the Producer Thread checks if the file is different by comparing the file metadata to the file metadata of the file in the previous backup on the staging disk. The Producer Thread can be configured to use criteria such as different file sizes, newer modification date, and/or other relevant criteria to identify files those need to be copied to the backup device. Producer Thread creates one or more backup work items for a file at step 1618 if the file needs to be copied to the backup device. Producer Thread adds newly created work items to work item queue 1602 at step 1618. Producer Thread completes at step 1620 once all the files in the file system are processed.

In some embodiments, the work item queue 1602 that a Producer Thread populates can be limited in size in order to, e.g., keep control on system resource utilization by backup application. Once the queue size grows to maximum allowed size of the queue, the producer thread has to wait until the Consumer Threads complete processing of the previously created work items. The size of the work item queue can be configured so as to adapt to varying resource availability levels.

Figure 17:
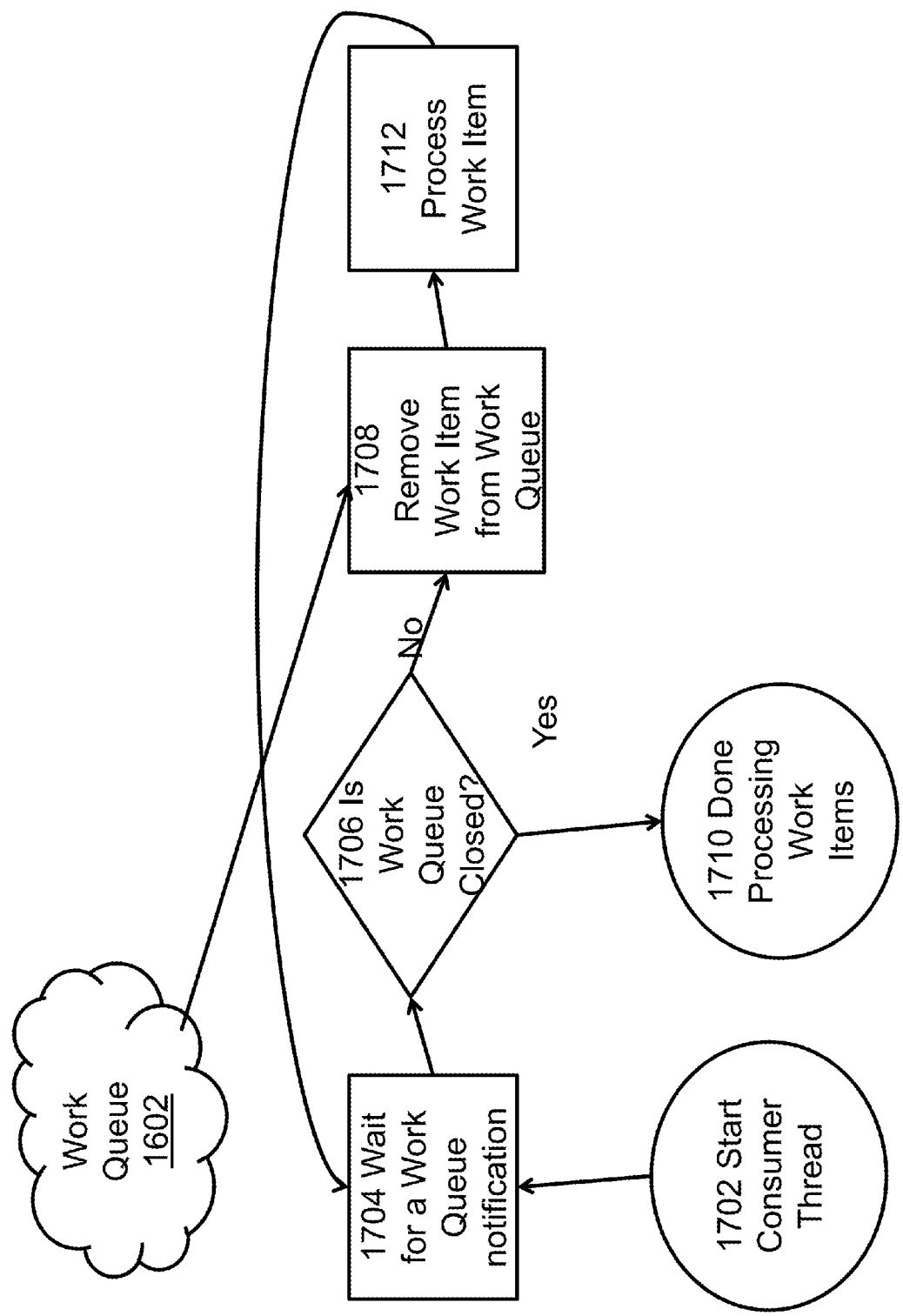
FIG. 17 is a flowchart illustrating a computerized workflow for a Consumer Thread, according to some embodiments.

FIG. 17 is a flowchart illustrating a computerized workflow for a Consumer Thread, according to some embodiments. There are often multiple Consumer Threads that can process work items in parallel. Parallel processing of work items increases the copy rate thereby reducing the time required to backup. At the start of copy operation 1702, Consumer Threads are often waiting for Producer Threads to populate work item queue 1602. Consumer Threads receive notification from Producer Thread at step 1704 that a work item is in the queue to be processed. Upon receipt of the notification, one of the available Consumer Threads checks if the work item queue is open at step 1706. In some embodiments, an open work item queue refers to a work item queue that contains one or more work items. Conversely, in some embodiments, a work item queue that is "not open" refers to a work item queue that is empty and where all producer threads have notified the work item queue that they have completed adding work items to the work item queue. If the work item queue is open, the consumer picks up the work item from the work item queue at step 1708. It then processes the work item at step 1712. Once the work item is processed completely, the Consumer Thread checks if there are any additional work items pending in the work item queue 1602 that need to be processed. If there are work items in the queue, it removes the next available work item and continues processing that work item.

Backing up a file involves a few operations such as creating a directory to hold file on backup storage, creating a file on backup storage, copying data from production storage to backup storage, updating metadata of file on backup storage, updating metadata of directory holding a copy of file on backup storage, etc. Each of these operations can be performed independently and can be an independent work item whose processing can be parallelized. For example, the backup of a single file can be divided into parallel tasks by separating one or more of the different operations into different work items.

Producer Threads can produce a variety of work items for backup operation that Consumer Threads consume. Each work item performs a specific backup task that can be performed independently.

FIG. 19A is a list of work item types, according to some embodiments. CreateFileWorkItem 1902 creates a file on backup storage. CopyBytesWorkItem 1904 copies a range of bytes from source file on Production Storage to target file on backup storage. UpdateFileMetadataWorkItem 1906 updates metadata of file on backup storage. CreateDirectoryWorkItem 1908 creates a directory on backup storage. DeleteFileWorkItem 1910 deletes a file on backup storage. DeleteDirectoryWorkItem 1912 deletes a directory on backup storage. CreateSymLinkWorkItem 1914 creates a symbolic link on the backup storage.

Some of the tasks during the backup process can be executed in specific order, while other tasks can be parallelized. For example, a file may need to be created on the backup storage before backup applications can copy data into the file. However, once a file is created on backup storage, multiple threads can copy data into various regions of the file. Individual work items created by Producer Threads can be used to capture this dependency of tasks on one another. Consumer Threads can be configured to honor the dependency of work items so that copy operations can be parallelized as much as it can be.

Figure 19B:
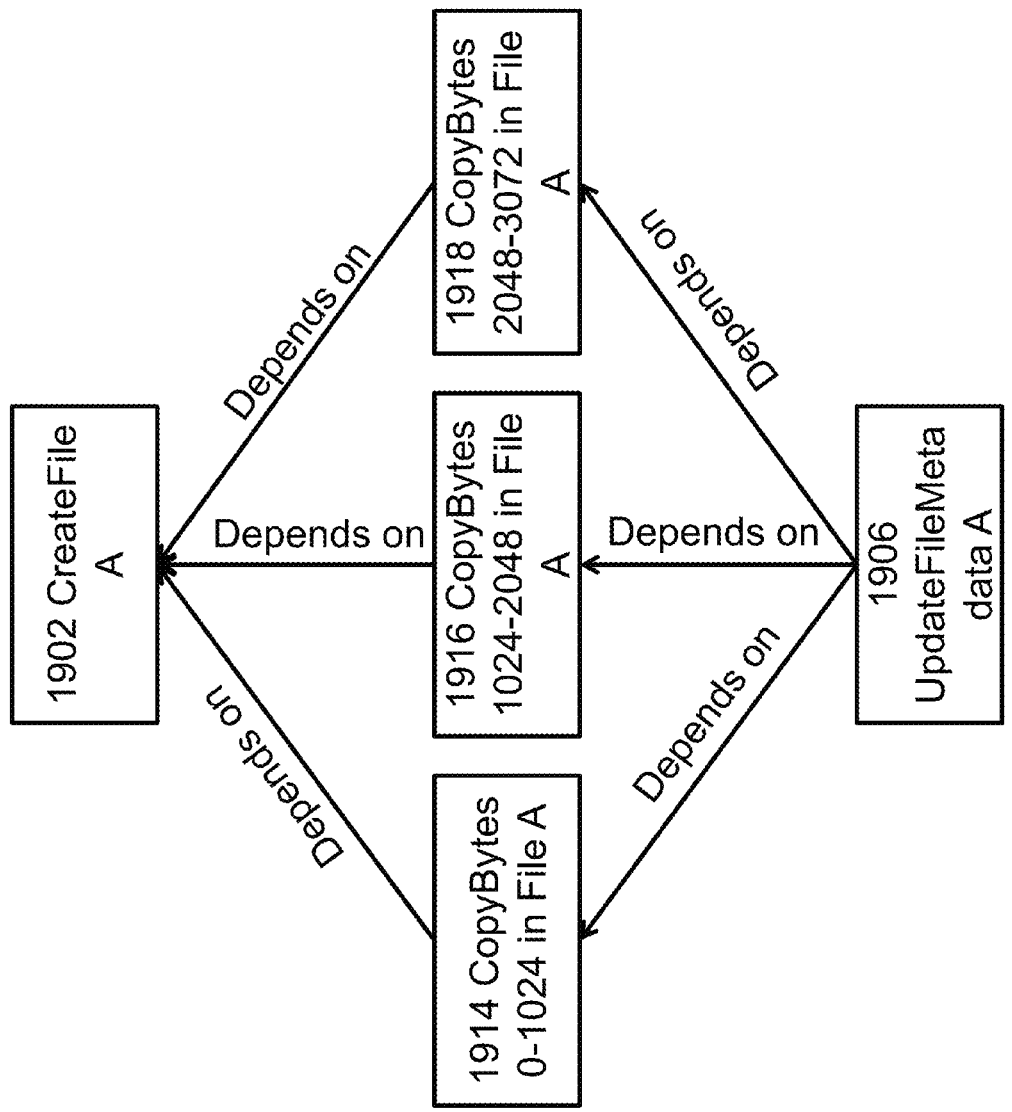
FIG. 19B is a flowchart illustrating work item dependencies, according to some embodiments.

FIG. 19B is a flowchart illustrating work item dependencies, according to some embodiments. In FIG. 19B, CreateFileWorkItem 1902 creates target file on backup storage. Data copy operation cannot be started until CreateFileWorkItem 1902 completes its work successfully. Work items 1914, 1916 and 1918 are CopyBytesWorkItem that copy a range of bytes from source file to copy of the file on backup storage. The CopyBytesWorkItem 1914, 1916 and 1918 depend on CreateFileWorkItem 1902. CopyBytesWorkItem is not eligible for processing until its dependency on CreateFileWorkItem 1902 is satisfied. Work item UpdateFileMetadata 1906 depends on CopyBytesWorkItem 1914, 1916 and 1918. UpdateFileMetadata 1906 work item is not eligible for processing until all work items 1902, 1914, 1916 and 1918 complete successfully.

A single file can be split into multiple chunks so that parts of the file can be copied in parallel. This helps improve copy throughput in certain environments. The size of each chunk can be determined by backup application at the time of copy depending on the network, storage and compute infrastructure, and/or the like.

The number of Consumer Threads and Producer Threads can be modified to achieve improved copy throughput based on network, storage and compute infrastructure. For example, in a high network latency environment with available network bandwidth, number of Consumer Threads can be increased to process more work items in parallel to improve copy rate. Multiple Producer Threads may be used for scanning different directories of a file share.

Processing of copy operation can be modified by implementing new behavior for Producer Threads, Consumer Threads or Work Items. For example when backing up a Common Internet File System (CIFS) share, if File Server hosting the share can provide a list of modified files within a time range, then Producer Thread does not need to scan entire file share to identify modified files. Instead Producer Thread can use the File Server API to retrieve the list of modified files and use the list to create appropriate work items. Similarly, if backup application has a way of finding modified blocks within a file that needs to be copied, a new work item can be implemented to query the changed blocks within file and copy only the changed blocks within the file instead of copying the entire file.

Figure 20:
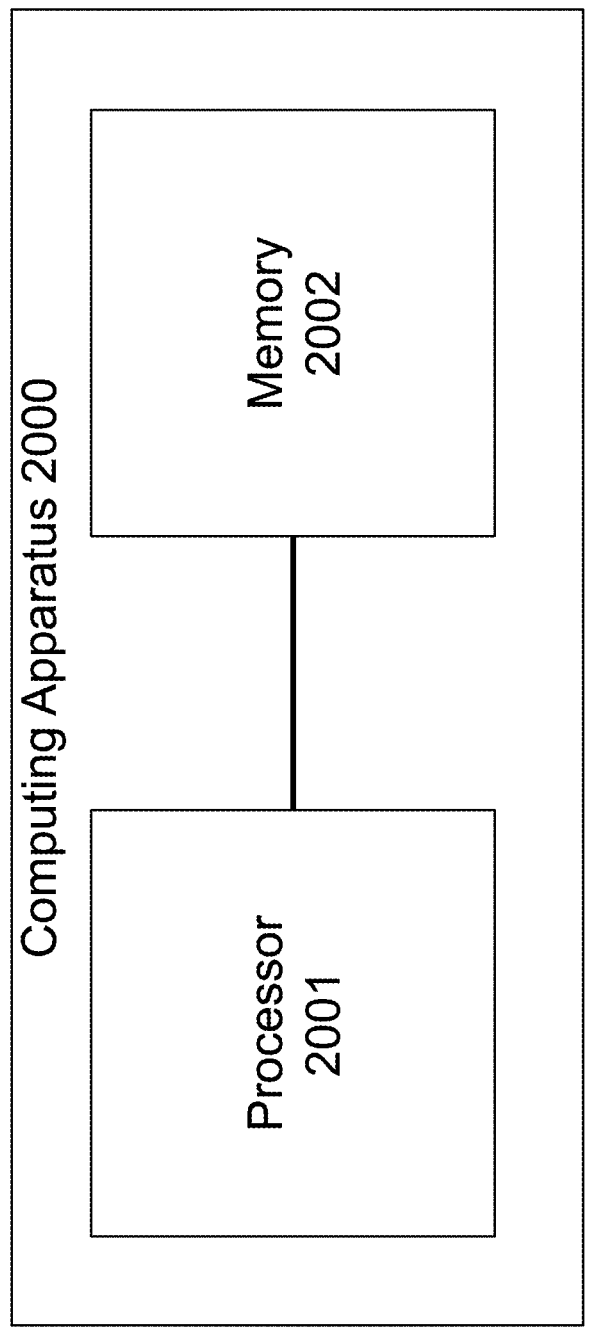
FIG. 20 is an exemplary computer system for multi-threaded smart copy and integrated database and log backup, according to some embodiments.

FIG. 20 is an exemplary computer system for multi-threaded smart copy, according to some embodiments.

FIG. 20 illustrates an exemplary computerized apparatus 2000 configured to provide multithreaded copying and integrated database and log backup, according to some embodiments. Computerized apparatus 2000 includes a processor 2001 in communication with temporary and/or permanent memory 2002. Memory 2002 stores instructions and is configured to cause the processor 2001 to perform the subject matter described herein, including the apparatuses and methods described above. As described further herein, the memory 2002 can be flash memory, a magnetic disk drive, an optical drive, a programmable read-only memory (PROM), a read-only memory (ROM), or any other memory or combination of memories. The processor 2001 can be a general purpose processor and/or can also be implemented using an application specific integrated circuit (ASIC), programmable logic array (PLA), field programmable gate array (FPGA), and/or any other integrated circuit. The computerized apparatus 2000 can include a database that may also be flash memory, a magnetic disk drive, an optical drive, a programmable read-only memory (PROM), a read-only memory (ROM), or any other memory or combination of memories. The computerized apparatus 6000 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method of performing backup of databases and associated logs with one schedule such that a backup of both a database and its associated log can be restored or recovered to a desired point in time, the method being executed by a processor in communication with memory storing instructions configured to cause the processor to:

receive a backup request, the backup request associated with a backup type defined by a service level agreement, the service level agreement defining a schedule for backing up a database associated with an application, the service level agreement including a combined schedule for backing up data stored in the database and log data associated with the database;

determine the backup type, the backup type including at least one of a database backup type, a log backup type, and a composite database backup and log backup type;

when the backup type comprises a database backup type:
transmit a database backup type instruction at a first time, to a host agent running on a database server, to create a first database backup, and
assign a first identifier to the first database backup, the first identifier including a first composite backup identifier indicative of a first set of log backups that share a first dependency relationship with the first database backup;

when the backup type comprises a log backup type:
transmit a log backup type instruction at a second time, to the host agent running on the database server, to create a first log backup,
assign the first identifier to the first log backup when the first time comprises a most recent prior database backup time to the second time, and
assign a second identifier to the first log backup when a most recent prior database backup time to the second time is associated with a second database backup, the second identifier including a second composite backup identifier indicative of a second set of log backups that share a second dependency relationship with the second database backup, the second set of log backups including the first log backup;

when the backup type comprises a composite database and log backup type:
transmit a composite database and log backup type instruction at a third time, to the host agent running on the database server, to create a composite database and log backup including a third database backup and a second log backup, and
assign a third identifier to the composite database and log backup, the third identifier including a third composite backup identifier indicative of a third set of log backups that share a third dependency relationship with the third database backup, the third set of log backups including the second log backup;

thereby performing data backup of databases and associated logs with one schedule such that a full backup of both a database and its associated log can be retrieved for a desired point in time.

2. The computerized method of claim 1, wherein the processor is further caused to:
expire at least one of the first log backup and the second log backup based on at least one of:
a log expiration request, and
a corresponding database backup being expired, the corresponding database backup sharing an identifier with the at least one of the first log backup and the second log backup; and
expire at least one of the first database backup, the second database backup, and the third database backup based on a database expiration request,
such that space becomes available for use by another backup.

3. The computerized method of claim 2, wherein each of the log expiration request and the database expiration request comprise at least one of:
an on demand request from a user; and
a scheduled expiration request based on the service level agreement.

4. The computerized method of claim 1, wherein the processor is further configured to use the method of claim 1 for restore and recovery of the database associated with the application.

5. The computerized method of claim 1, wherein the second composite backup identifier equals the third composite backup identifier when the third time comprises a most recent prior database backup time to the second time.

6. The computerized method of claim 1, wherein each of the first log backup, the second log backup, the first database backup, the second database backup, and the third database backup comprise a snapshot.

7. The computerized method of claim 1, wherein:
the first identifier further includes a first recovery range indicating a first set of database and log backups available for restoration and recovery, the first recovery range including the first database backup;
the second identifier further includes a second recovery range indicating a second set of database and log backups available for restoration and recovery, the second recovery range including the first log backup, the second database backup, and other log backups captured between the second time and the most recent prior database backup time; and the third identifier further includes a third recovery range, the third recovery range including the composite database and log backup and any log backups subsequent to the composite database and log backup associated with the third composite backup identifier.

8. A computing system for performing backup of databases and associated logs with one schedule such that a backup of both a database and its associated log can be restored or recovered to a desired point in time, the computing system comprising:
a processor;
a memory coupled to the processor and including instructions that, when executed by the processor, cause the processor to:
receive a backup request, the backup request associated with a backup type defined by a service level agreement, the service level agreement defining a schedule for backing up a database associated with an application, the service level agreement including a combined schedule for backing up data stored in the database and log data associated with the database;
determine the backup type, the backup type including at least one of a database backup type, a log backup type, and a composite database backup and log backup type;
when the backup type comprises a database backup type:
transmit a database backup type instruction at a first time, to a host agent running on a database server, to create a first database backup, and
assign a first identifier to the first database backup, the first identifier including a first composite backup identifier indicative of a first set of log backups that share a first dependency relationship with the first database backup;
when the backup type comprises a log backup type:
transmit a log backup type instruction at a second time, to the host agent running on the database server, to create a first log backup,
assign the first identifier to the first log backup when the first time comprises a most recent prior database backup time to the second time, and
assign a second identifier to the first log backup when a most recent prior database backup time to the second time is associated with a second database backup, the second identifier including a second composite backup identifier indicative of a second set of log backups that share a second dependency relationship with the second database backup, the second set of log backups including the first log backup;
when the backup type comprises a composite database and log backup type:
transmit a composite database and log backup type instruction at a third time, to the host agent running on the database server, to create a composite database and log backup including a third database backup and a second log backup, and
assign a third identifier to the composite database and log backup, the third identifier including a third composite backup identifier indicative of a third set of log backups that share a third dependency relationship with the third database backup, the third set of log backups including the second log backup;
thereby performing data backup of databases and associated logs with one schedule such that a full backup of both a database and its associated log can be retrieved for a desired point in time.

9. The computing system of claim 8, wherein the processor is further configured to:
expire at least one of the first log backup and the second log backup based on at least one of:
a log expiration request, and
a corresponding database backup being expired, the corresponding database backup sharing an identifier with the at least one of the first log backup and the second log backup; and
expire at least one of the first database backup, the second database backup, and the third database backup based on a database expiration request,
such that space becomes available for use by another backup.

10. The computing system of claim 9, wherein each of the log expiration request and the database expiration request comprise at least one of:
an on demand request from a user; and
a scheduled expiration request based on the service level agreement.

11. The computing system of claim 8, wherein the processor is further configured to use the computing system of claim 8 for restore and recovery of the database associated with the application.

12. The computing system of claim 8, wherein the second composite backup identifier equals the third composite backup identifier when the third time comprises a most recent prior database backup time to the second time.

13. The computing system of claim 8, wherein each of the first log backup, the second log backup, the first database backup, the second database backup, and the third database backup comprise a snapshot.

14. The computing system of claim 8, wherein:
the first identifier further includes a first recovery range indicating a first set of database and log backups available for restoration and recovery, the first recovery range including the first database backup;
the second identifier further includes a second recovery range indicating a second set of database and log backups available for restoration and recovery, the second recovery range including the first log backup, the second database backup, and other log backups captured between the second time and the most recent prior database backup time; and
the third identifier further includes a third recovery range, the third recovery range including the composite database and log backup and any log backups subsequent to the composite database and log backup associated with the third composite backup identifier.

15. A non-transitory computer readable medium having executable instructions operable to cause an apparatus to:
receive a backup request, the backup request associated with a backup type defined by a service level agreement, the service level agreement defining a schedule for backing up a database associated with an application, the service level agreement including a combined schedule for backing up data stored in the database and log data associated with the database;
determine the backup type, the backup type including at least one of a database backup type, a log backup type, and a composite database backup and log backup type;
when the backup type comprises a database backup type:
transmit a database backup type instruction at a first time, to a host agent running on a database server, to create a first database backup, and
assign a first identifier to the first database backup, the first identifier including a first composite backup identifier indicative of a first set of log backups that share a first dependency relationship with the first database backup;
when the backup type comprises a log backup type:
transmit a log backup type instruction at a second time, to the host agent running on the database server, to create a first log backup,
assign the first identifier to the first log backup when the first time comprises a most recent prior database backup time to the second time, and
assign a second identifier to the first log backup when a most recent prior database backup time to the second time is associated with a second database backup, the second identifier including a second composite backup identifier indicative of a second set of log backups that share a second dependency relationship with the second database backup, the second set of log backups including the first log backup;
when the backup type comprises a composite database and log backup type:
transmit a composite database and log backup type instruction at a third time, to the host agent running on the database server, to create a composite database and log backup including a third database backup and a second log backup, and
assign a third identifier to the composite database and log backup, the third identifier including a third composite backup identifier indicative of a third set of log backups that share a third dependency relationship with the third database backup, the third set of log backups including the second log backup;
thereby performing data backup of databases and associated logs with one schedule such that a full backup of both a database and its associated log can be retrieved for a desired point in time.

16. The non-transitory computer readable medium of claim 15, wherein the apparatus is further caused to:
expire at least one of the first log backup and the second log backup based on at least one of:
a log expiration request, and
a corresponding database backup being expired, the corresponding database backup sharing an identifier with the at least one of the first log backup and the second log backup; and
expire at least one of the first database backup, the second database backup, and the third database backup based on a database expiration request,
such that space becomes available for use by another backup.

17. The non-transitory computer readable medium of claim 16, wherein each of the log expiration request and the database expiration request comprise at least one of:
an on demand request from a user; and
a scheduled expiration request based on the service level agreement.

18. The non-transitory computer readable medium of claim 15, wherein the apparatus is further caused to use the apparatus of claim 15 for restore and recovery of the database associated with the application.

19. The non-transitory computer readable medium of claim 15, wherein the second composite backup identifier equals the third composite backup identifier when the third time comprises a most recent prior database backup time to the second time.

20. The non-transitory computer readable medium of claim 15, wherein:
- the first identifier further includes a first recovery range indicating a first set of database and log backups available for restoration and recovery, the first recovery range including the first database backup;
- the second identifier further includes a second recovery range indicating a second set of database and log backups available for restoration and recovery, the second recovery range including the first log backup, the second database backup, and other log backups captured between the second time and the most recent prior database backup time; and
- the third identifier further includes a third recovery range, the third recovery range including the composite database and log backup and any log backups subsequent to the composite database and log backup associated with the third composite backup identifier.

* * * * *